(12) United States Patent
Carpenter

(10) Patent No.: US 12,181,302 B1
(45) Date of Patent: Dec. 31, 2024

(54) SYSTEM, MEDIA, AND METHOD FOR ENHANCED NAVIGATION

(71) Applicant: Interstate Data USA, Inc., Ashland, KY (US)

(72) Inventor: Randall Ray Carpenter, Ashland, KY (US)

(73) Assignee: Interstate Data USA, Inc.

( * ) Notice: Subject to any disclaimer, the term of this patent is extended or adjusted under 35 U.S.C. 154(b) by 354 days.

(21) Appl. No.: 16/942,073

(22) Filed: Jul. 29, 2020

(51) Int. Cl.
*G01C 21/00* (2006.01)
*G01C 21/34* (2006.01)
*G01C 21/36* (2006.01)
*G06F 16/245* (2019.01)
*G06F 16/248* (2019.01)
*G06F 16/29* (2019.01)
*H04W 4/024* (2018.01)

(52) U.S. Cl.
CPC ..... *G01C 21/3682* (2013.01); *G01C 21/3476* (2013.01); *G06F 16/245* (2019.01); *G06F 16/248* (2019.01); *G06F 16/29* (2019.01); *H04W 4/024* (2018.02)

(58) Field of Classification Search
CPC . G01C 21/3682; G06F 16/245; G06F 16/248; G06F 16/29
USPC ....................................................... 701/411
See application file for complete search history.

(56) References Cited

U.S. PATENT DOCUMENTS

| | | | |
|---|---|---|---|
| 7,873,471 B2 | 1/2011 | Gieseke | |
| 8,731,814 B2 | 5/2014 | Schunder | |
| 9,146,118 B2 | 9/2015 | Liu et al. | |
| 10,371,536 B2 | 8/2019 | König et al. | |
| 2006/0089788 A1* | 4/2006 | Laverty | G01C 21/3679 701/426 |
| 2007/0010942 A1* | 1/2007 | Bill | G01C 21/3617 701/424 |
| 2011/0218831 A1* | 9/2011 | Bolling | G06Q 30/0237 705/5 |
| 2013/0185355 A1* | 7/2013 | Tseng | H04W 4/60 709/204 |

(Continued)

FOREIGN PATENT DOCUMENTS

| | | | | |
|---|---|---|---|---|
| DE | 102014204758 A1 * | 9/2014 | | G08G 1/22 |
| WO | WO-2010111833 A1 * | 10/2010 | | G01C 21/00 |
| WO | WO-2020050842 A1 * | 3/2020 | | G01C 21/3617 |

*Primary Examiner* — Tiffany P Young
(74) *Attorney, Agent, or Firm* — Dinsmore & Shohl LLP

(57) ABSTRACT

Systems, methods, and media for enhanced navigation are provided. A method may include determining a current location based upon received location data. The method may also comprise receiving query data requesting a plurality of destination types. The method may further comprise determining a result set comprising a plurality of locations corresponding to destination types within a first threshold distance of the current location. The method may additionally comprise returning a result subset comprising a plurality of the result set destination types based upon a second threshold distance that differs from the first threshold distance, wherein the second threshold distance is a distance between each of the requested destination types within the result subset or a common location and each of the requested destination types within the result subset. The method updating the current location, the result set, and the result subset based upon receiving updated location data.

20 Claims, 19 Drawing Sheets

(56) References Cited

U.S. PATENT DOCUMENTS

| | | | |
|---|---|---|---|
| 2015/0204688 A1* | 7/2015 | Gearhart | G01C 21/3682 |
| | | | 701/540 |
| 2016/0364224 A1* | 12/2016 | Tuukkanen | H04L 67/10 |
| 2017/0067750 A1* | 3/2017 | Day | G08G 1/096716 |

* cited by examiner

SYSTEM, MEDIA, AND METHOD FOR ENHANCED NAVIGATION

TECHNICAL FIELD

The present application generally relates to navigational systems, such as navigational systems used by vehicle operators and passengers alike.

BACKGROUND

Drivers and passengers often want to make intermediate stops along their travel route, such as on a highway or interstate. These stops may be planned or arise spontaneously, and may relate to a variety of points of interest such as fuel, meals, lodging, shopping, and the like. Traditionally, road signs, maps, and atlases were utilized to locate where to make such points of interest. The proliferation of navigational systems now allows vehicle operators and passengers to more conveniently search for such points of interest. However, current navigational hardware and software still have important shortcomings.

Accordingly, a need exists for systems that provide enhanced navigation for en route stops, along with media and methods of use of such systems.

SUMMARY

A method may comprise determining a current location based upon received location data. The method may also comprise receiving query data requesting a plurality of destination types. The method may further comprise determining a result set comprising a plurality of locations corresponding to destination types within a first threshold distance of the current location. The method may additionally comprise returning a result subset comprising a plurality of the result set destination types based upon a second threshold distance that differs from the first threshold distance, wherein the second threshold distance is a distance between each of the requested destination types within the result subset or a common location and each of the requested destination types within the result subset. The method updating the current location, the result set, and the result subset based upon receiving updated location data.

In another embodiment, a system may comprise memory and a processor coupled to the memory, wherein the processor is configured to determine a current location based upon received location data. The processor may be further configured to receive query data requesting a plurality of destination types. The processor may also be configured to determine a result set comprising a plurality of locations corresponding to destination types within a first threshold distance of the current location. The processor may be additionally configured to return a result subset comprising a plurality of the result set destination types based upon a second threshold distance that differs from the first threshold distance, wherein the second threshold distance is a distance between each of the requested destination types within the result subset or a common location and each of the requested destination types within the result subset. The processor also may be configured to update the current location, the result set, and the result subset based upon receiving updated location data.

In yet another embodiment, a non-transitory computer readable medium embodies computer-executable instructions that, when executed by a processor, cause the processor to determine a current location based upon received location data. The processor may also receive query data requesting a plurality of destination types. The processor may further determine a result set comprising a plurality of locations corresponding to destination types within a first threshold distance of the current location. The processor may also return a result subset comprising a plurality of the result set destination types based upon a second threshold distance that differs from the first threshold distance, wherein the second threshold distance is a distance between each of the requested destination types within the result subset or a common location and each of the requested destination types within the result subset. The processor may also update the current location, the result set, and the result subset based upon receiving updated location data.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to methods, systems, and media for enhanced navigation. For a given travel route, multiple types of destinations may be desired, such as a gas station, a pharmacy, and a restaurant. A driver may be travelling on a highway and want to find an exit that has all three types of destinations. Manually searching for one type of destination, such as seeing which exits have gas stations, and then separately searching for pharmacies, and then separately searching for restaurants, is very inefficient and leads to inaccuracies, particularly when trying to manually compare separate query results. Additional challenges can be encountered when trying to further incorporate particular brands or pricing information (gas prices, hotel prices, and the like). Utilizing a navigation system that allows for a more holistic approach, such as multiple destination types, which can be drilled down to particular brands, along with useful pricing information, can provide a much more useful and technologically superior navigation experience.

Figure 1A:
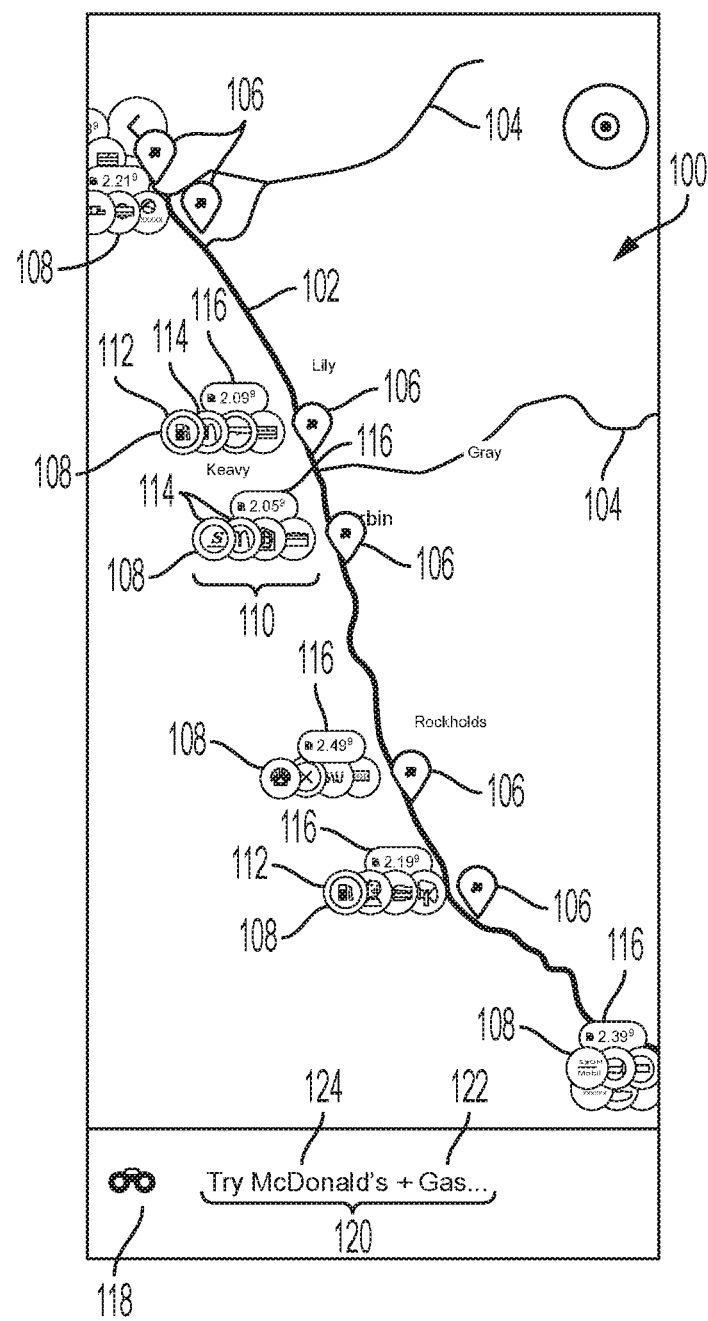
FIG. 1A schematically illustrates an exemplary interface displaying options corresponding to exits along a route, according to one or more embodiments shown and described herein.

Referring now to FIG. 1A, an exemplary interface 100 displaying options corresponding to exits along a route is depicted, through which embodiments of the disclosure can be implemented. An interface 100 may be presented in the form of a graphical user interface or any other suitable type of interface, and may be touchscreen, gaze-controlled, gesture-controlled, button actuated, knob-actuated, and the like. In this embodiment, a route 102 utilizing a highway is presented in which roads 104 are accessed from the route 102 via exits 106 (which may be referred to herein as "highway mode"). A route 102 may include any path that is traversable by a car, truck, motorcycle, bicycle, aircraft, watercraft, or any other mode of transportation capable of transporting at least one person.

In response to a query 118, a result set 108 of destinations may be provided along the route 102. In this embodiment, the result set 108 comprises various destinations along various roads 104, although other destinations could be available along the highway, such as in toll plazas. Within the result set 108, there may be multiple result subsets 110. In this embodiment, each result subset 110 corresponds to an exit 106, although result subsets 110 may be grouped based upon any suitable criteria. Within the result subsets 110 are destination category icons 112 and/or destination type icons 114. Destination category icons 112 may be any general category of destination, such as gas stations, restaurants, pharmacies, grocery stores, and the like. Destination type icons 114 may be utilized to represent a particular brand or otherwise uniquely identifiable destination, such as a particular brand of gas station, restaurant, pharmacy, grocery store, and the like. In this example, particular brands displayed include McDonald's® (McDonald's® Arches design is a registered trademark of MCDONALD'S CORPORATION), Shell® (Shell® design is a registered trademark of Shell Trademark Management B.V. LIMITED LIABILITY COMPANY), and Exxon Mobil®, a registered trademark of Exxon Mobil Corporation.

A query 118 option may be utilized for a user to enter a query, which may pertain the user's current route, surroundings, and/or any other requested or unrequested geographical location. Although depicted in this embodiment as a clickable icon, a query may be entered based upon automatic prompting from the interface 100 or any other suitable user input requesting a query (gesture, gaze tracking, touch screen, text prompt, keyboard/keypad, mouse/cursor, and the like). In this embodiment, a query suggestion 120 may be presented with a category component 122 (e.g., gas stations) and/or a destination component 124 (such as McDonald's®). In this embodiment, the query suggestion 120 may be based upon prior user search history (the current user and/or other users), the current location, and/or any other suitable metric to base a query suggestion 120 upon. In other embodiments, there may be multiple or no category components 122 and/or destination components 124.

The user may click on the query 118 icon to execute the query suggestion 120, or modify/redo the query suggestion 120. In other embodiments, there may be multiple or no query suggestions 120 and/or query fields. In some embodiments, the user can select a destination component 124 and select other destination components 124 within the same or similar category components 122 and/or more broadly select the category component 122 in which the selected destination component 124 resides. For example, the user could select destination component 124 McDonald's® and replace it with one or more other brands of restaurant (i.e., different destination components 124 within the restaurant category component 122) or with the restaurant category component 122. As another example, the user may want to keep McDonald's® as a destination component 124, while replacing the category component 122 (e.g., gas stations) with specific brands of gas stations and/or other category components 122 (e.g., pharmacy, grocery store, etc.). In some embodiments, the user may simply enter their query without any query suggestion 120.

The interface 100 may utilize any suitable database(s), such as 1018 in FIG. 10, as described below. Databases may be utilized for mapping and/or comparing data with maps, such as determining destination category icons 112, destination type icons 114, result sets 108, result subsets 110, price data 116, and the like. Mapping may be performed locally by any suitable processor(s), such as 1002 in FIG. 10 and/or remotely utilizing any suitable mapping/GPS software.

Figure 1B:
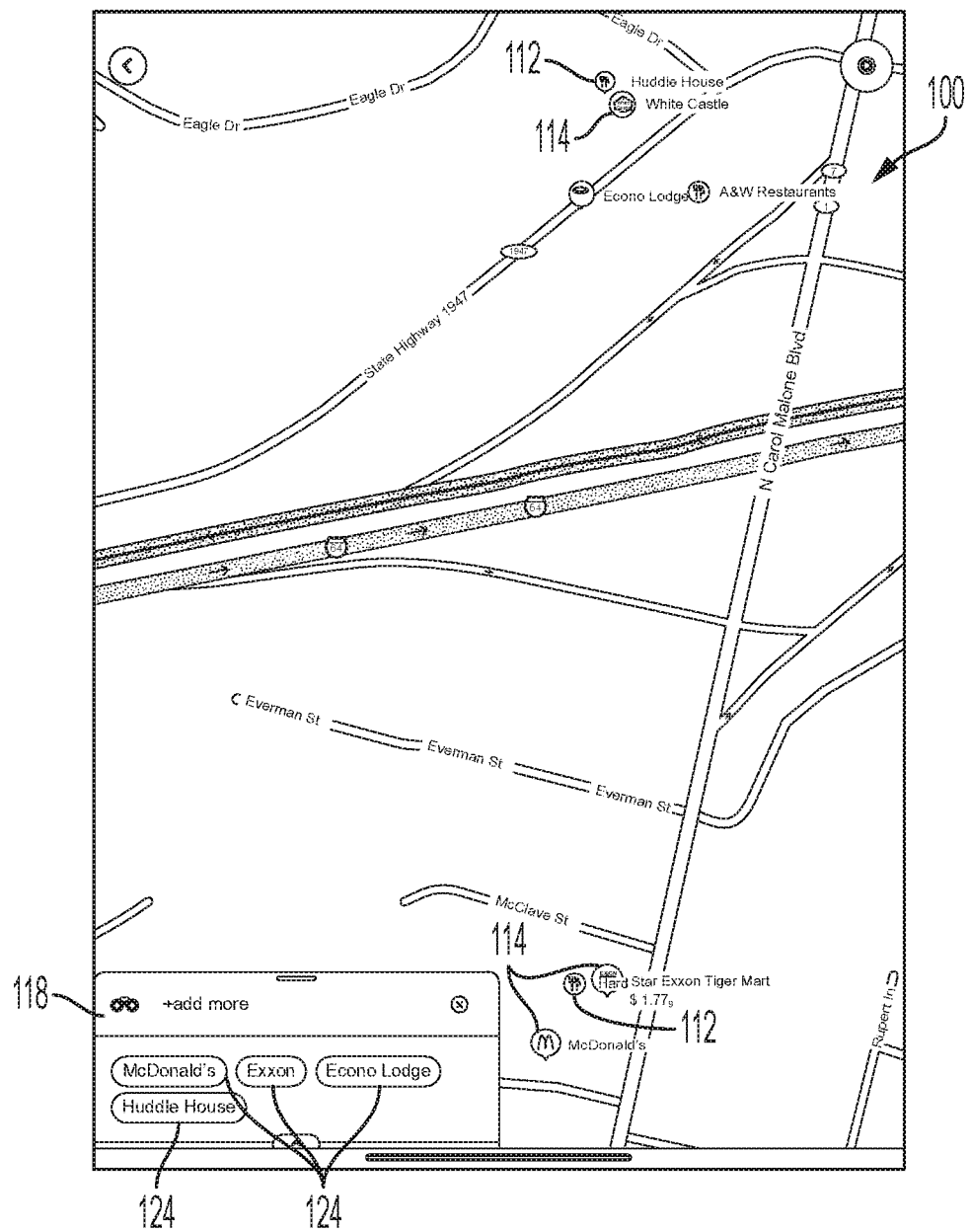
FIG. 1B schematically illustrates an exemplary interface displaying options corresponding to a selected exit along the route, according to one or more embodiments shown and described herein.

Referring now to FIG. 1B, an exemplary interface 100 displaying options corresponding to exits along a route is depicted, through which embodiments of the disclosure can be implemented. In this embodiment, the user has taken an exit 106 in FIG. 1A and is now presented with destination category icons 112 (two instances of a restaurant icon) and destination type icons 114 (icons indicating the brands McDonald's®, White Castle®, Star Exxon Tiger Mart®, and ECONO LODGE INN & SUITES®) within the surrounding area at the exit (which may be based on a radius from the current location or any other suitable criteria). In this embodiment, the results correspond to the query submitted in FIG. 1A, by returning McDonald's® (which was requested as a destination type or brand) and a gas station (Star Exxon Tiger Mart®). Here, Star Exxon Tiger Mart® was returned as a destination type icon 114. In other embodiments, destination category icons 112 that merely indicate a gas station (without mention to a specific brand or destination type) may be returned. White Castle® and design is a registered trademark of White Castle Management Co. A&W® is a registered trademark of A & W Concentrate. ECONO LODGE INN & SUITES® is a registered trademark of Choice Hotels International, Inc. Huddle House® is a registered trademark of Huddle House, Inc. Star Exxon Tiger Mart® is a registered trademark of Exxon Mobil Corporation.

In some embodiments, if there were no McDonald's® to be returned as results in response to the query 118, then other restaurants could be returned, as destination category icons 112 and/or as destination type icons 114. In this embodiment, even though McDonald's® was the only restaurant requested in the query 118 in FIG. 1A, more restaurant results are returned, such as A&W® and Huddle House® presented with destination category icons 112 generally indicating restaurants. In other embodiments, destination type icons 114 with specific brands may be presented even if those restaurants were not part of the query 118. In some embodiments, within the same query, a user may request one or more brands of restaurants mixed with one or more category requests (such as for restaurants generally). In some embodiments, a requested brand (such as McDonald's®) may be displayed more prominently based upon being specifically requested in a query. In other embodiments, brand prominence may be based upon predetermined brand placement (advertising agreements, price compatibility/range, and the like).

In this embodiment, the query 118 is presented with destination components 124. The query may be modified at any time, for example, by adding/removing/changing destination components 124 and/or category component 122. The updated query 118 may then be automatically run, may be run based upon further input received from a user, or may be a persistent query through which real-time data is fed. At any time, a user may request directions to one or more of the destinations. A user may select any number of destinations, and while a default route may be based upon any suitable criteria (such as selecting first destination based upon best proximity to current location), the user and/or interface 100 may re-order destinations based upon any suitable criteria (such as changing traffic conditions).

Figure 2A:
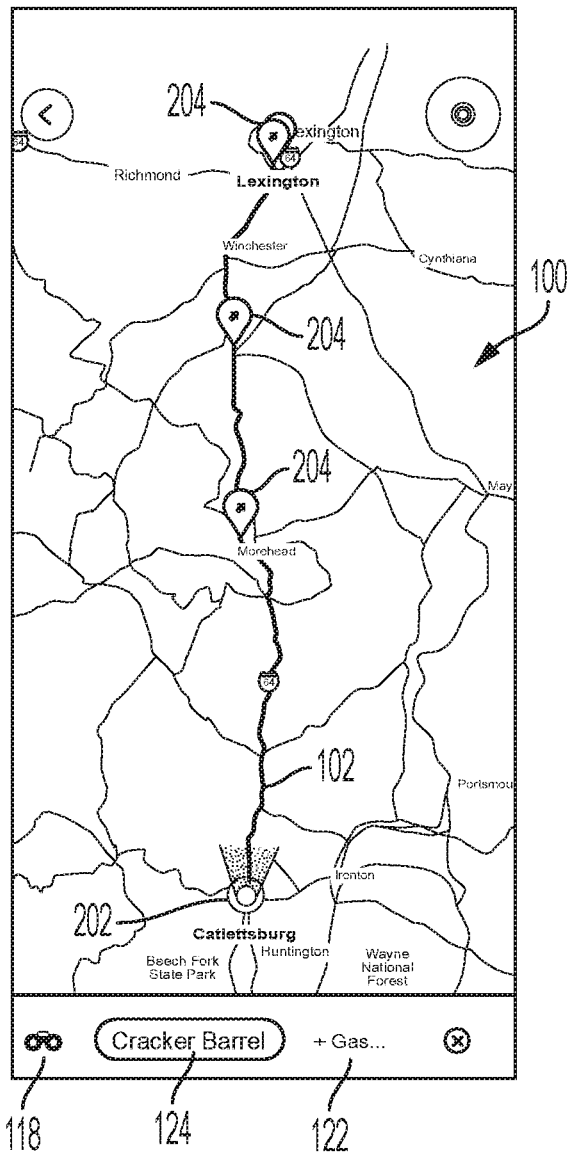
FIG. 2A schematically illustrates an exemplary interface displaying a query for locations of a restaurant chain along a route, according to one or more embodiments shown and described herein.

Referring now to FIG. 2A, an exemplary interface 100 displaying a query for locations of a restaurant chain along a route, through which embodiments of the disclosure can be implemented. In this example, a user has requested result instances 204 for Cracker Barrel® (destination component 122) along their route 102, based upon the current location 202 of the user's device. Cracker Barrel® is a registered trademark of Kraft Foods Group Brands LLC or CBOCS Properties, Inc. A query suggestion 120 to add a gas station category component 122 is presented. If utilized, the result instances 204 may be updated to only show those destination component 124 Cracker Barrel® locations near a category component 122 gas station. Any suitable criteria may be utilized to determine what constitutes, for example, a Cracker Barrel® being suitably close to a gas station, such as distance, which may be defined by the user, by the interface 100, and the like.

Figure 2B:
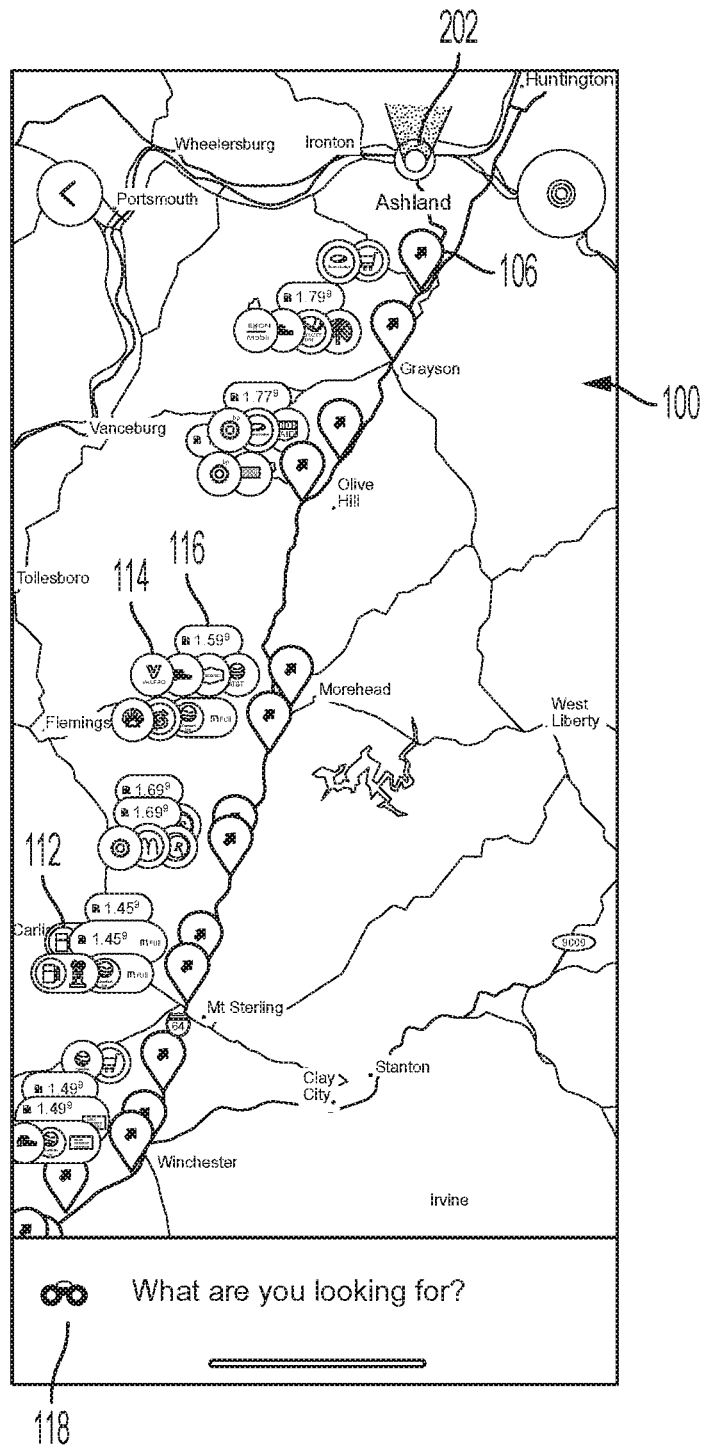
FIG. 2B schematically illustrates an exemplary interface displaying a cheapest-gas query along a route, according to one or more embodiments shown and described herein.

Referring now to FIG. 2B, an exemplary interface 100 displaying a cheapest-gas query along a route 102 is depicted, through which embodiments of the disclosure can be implemented. A result set 108 is presented in the interface 100 with a result subset 110 given at each exit 106 along the route 102. In another embodiment, the result set is provided without a query, which may be based upon an identified route, the current travel direction, and/or any other suitable criteria. Here, price data 116 (e.g., a gas station price-per-gallon) is provided for gas stations along the way (which may be referred to herein as "cheapest price mode"). Price data 116, such as for gas stations, may be obtained from any suitable data sources such as one or more remote databases. By way of example, not all price data 116 for all gas stations and/or gas station prices may be available at all times. In this embodiment, prices for gas stations and prices are shown. In other embodiments, a user can specify price data 116 criteria (highest, lowest, range, and the like) such that only gas stations meeting the specified price data 116 criteria are displayed, or are displayed as an icon but no price showing. In other embodiments, price data 116 may be used for other destination categories such as hotels, grocery stores, pharmacies, and the like. BP and design is America's Drive-In Brand Properties LLC a registered trademark of BP p.l.c. Tree design is a registered trademark of DOLLAR TREE STORES, INC. Rite Aid Shield design is a registered trademark of Rite, L.L.C. V Valero design is a registered trademark of Valero Refining and Marketing Company. AT&T design is a registered trademark of AT&T Intellectual Property. Health Mart design is a registered trademark of Health Mart Systems, Inc. Globe design (Comfort Inn®) is a registered trademark of CHOICE HOTELS INTERNATIONAL, INC. Hamilton Inn® and design is a registered trademark of HILTON INTERNATIONAL HOLDING LLC. Pizza Papa John's® and design is a registered trademark of Papa John's International, Inc.

Figure 3A:
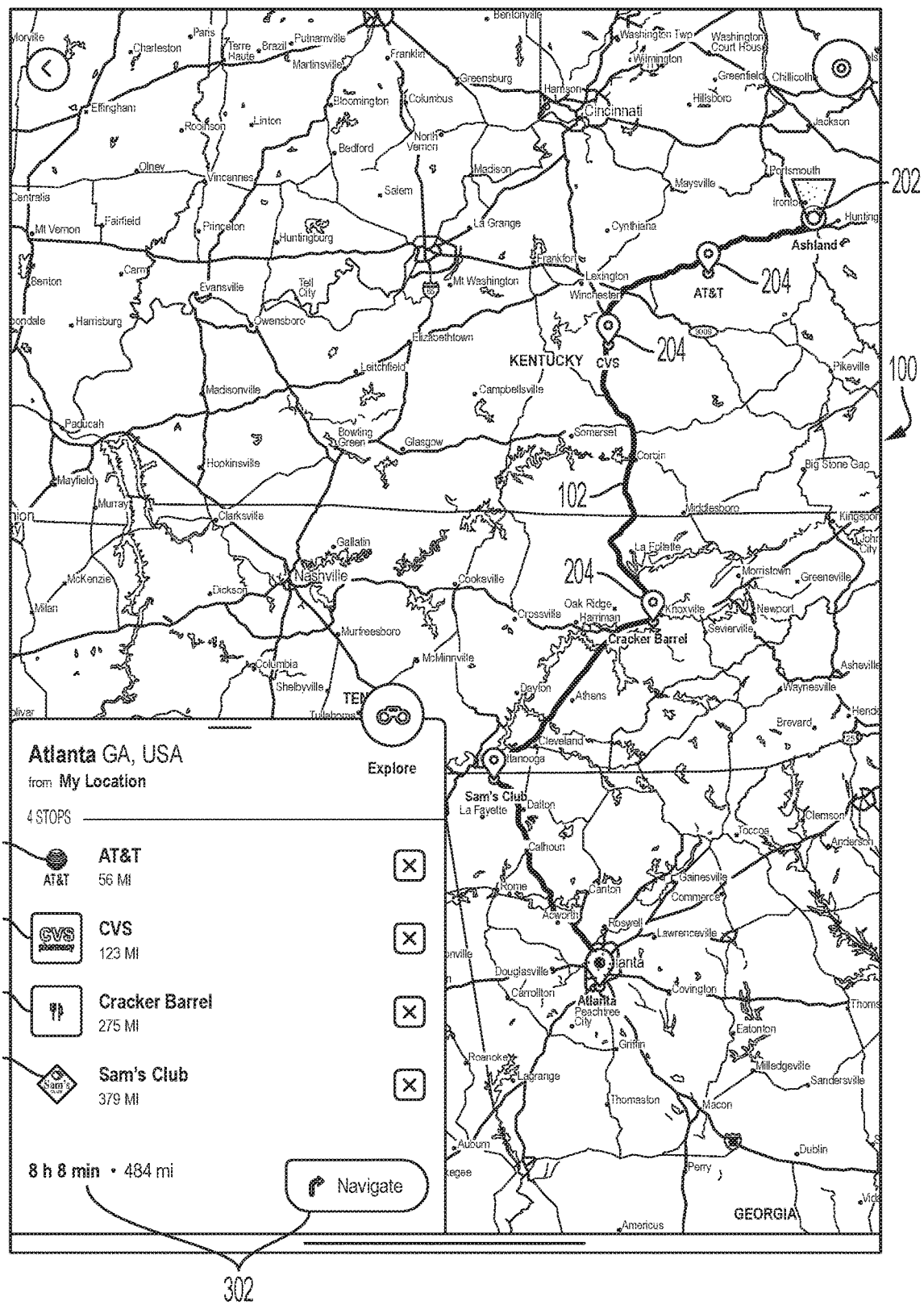
FIG. 3A schematically illustrates an exemplary interface displaying a multi-criteria query with results provided sequentially along a route, according to one or more embodiments shown and described herein.

Referring now to FIG. 3A, an exemplary interface 100 displaying a multi-criteria query (which may be referred to herein as "trav match") with results provided sequentially along a route is depicted, through which embodiments of the disclosure can be implemented. Here, a user has specified multiple destination type icons 114 to plan a route, which in this example are AT&T®, CVS Pharmacy®, and Sam's Club®, along with Cracker Barrel® represented by a destination category icon 112 for restaurant, which in various embodiments may be due to the lack of availability of a particular destination type icon 114. CVS Pharmacy stylized is a registered trademark of CVS Pharmacy®, Inc., Cracker Barrel®, and Sam's Club® and diamond design is a registered trademark of WALMART APOLLO, LLC.

In this embodiment, the interface 100 determines a route with navigation information 302 from the current location to Atlanta, Georgia that provides stops for each destination (destination type icons 114 and/or destination category icons 112). Navigation information 302 may include distance, estimated travel time, and/or any other pertinent information pertaining to planning a route 102. In some embodiments, a threshold deviation distance may allow for some amount of deviation from the route 102 for a particular destination. If a destination is not available within a certain distance (which may be determined by the user or the interface) of the route 102 and/or other destinations, then alternative destination suggestions, such as other destination types within the same destination category may be provided, suggested, or automatically utilized.

Figure 3B:
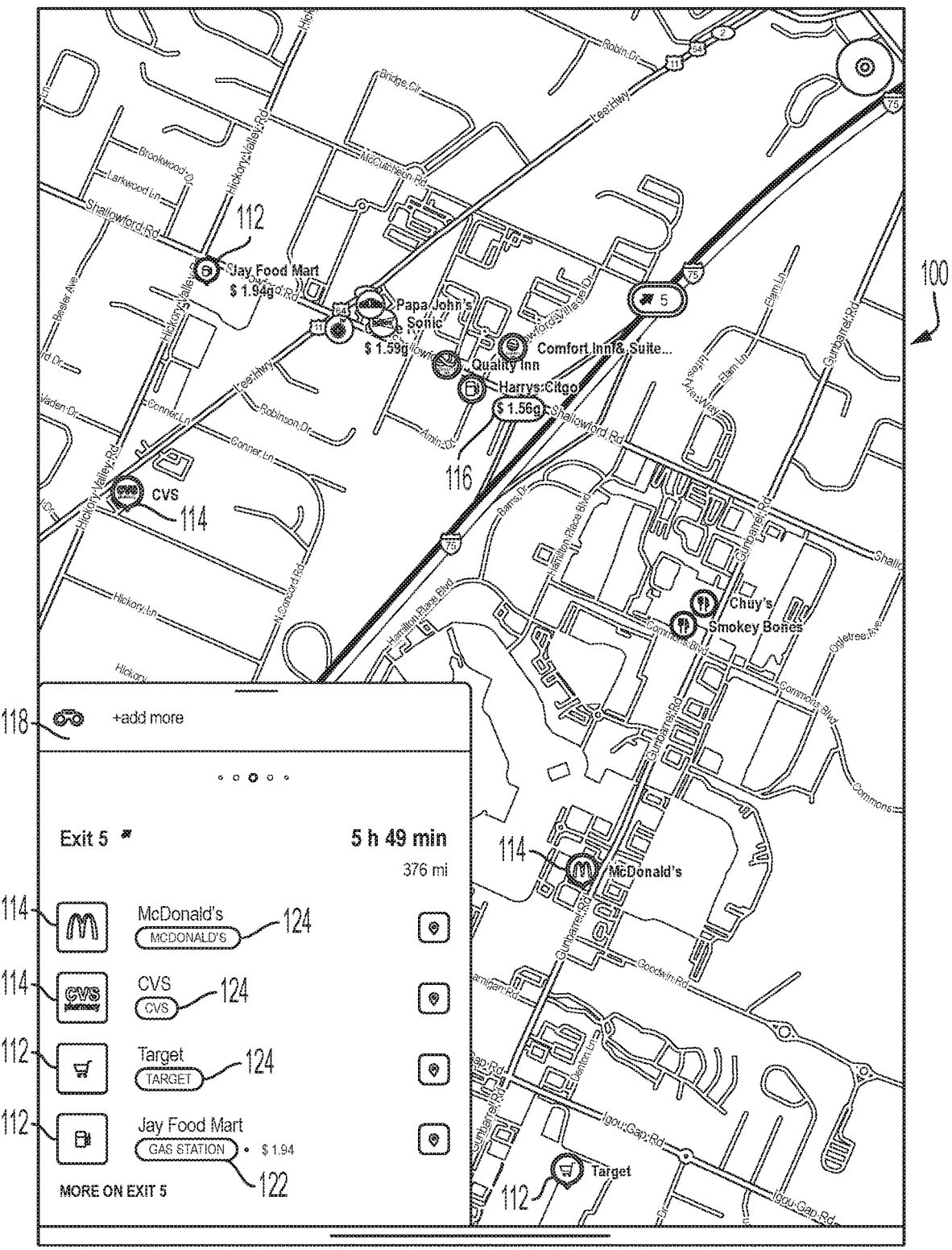
FIG. 3B schematically illustrates an exemplary interface displaying a multi-criteria query with mixed brand-specific and generic results provided at an exit along a route, according to one or more embodiments shown and described herein.

Referring now to FIG. 3B, an exemplary interface 100 displaying a multi-criteria query with mixed brand-specific and generic results provided at an exit along a route is depicted, through which embodiments of the disclosure can be implemented. In this embodiment, a user views an exit along their route utilizing destination components 124 McDonalds®, CVS Pharmacy®, and Target®, and category component 122 Jay Food Mart. Sonic and design is a registered trademark of AMERICA'S DRIVE-IN BRAND PROPERTIES LLC. Quality Inn® and design is a registered trademark of Choice Hotels International, Inc. Citgo Triangle design is a registered trademark of CITGO PETROLEUM CORPORATION. Chuy's® stylized is a registered trademark of CHUY'S OPCO, INC. Smokey Bones design is a registered trademark of Barbeque Integrated, Inc. Target design is a registered trademark of Target Brands, Inc.

A destination category icon 112 may be utilized with destination component 124, such as if a particular brand icon is not available, or vice versa. Additional potential destinations may also be provided, such as other restaurants so that the user can have a greater selection, such as additional restaurant choices even if the user previously indicated a particular brand preference.

Figure 4A:
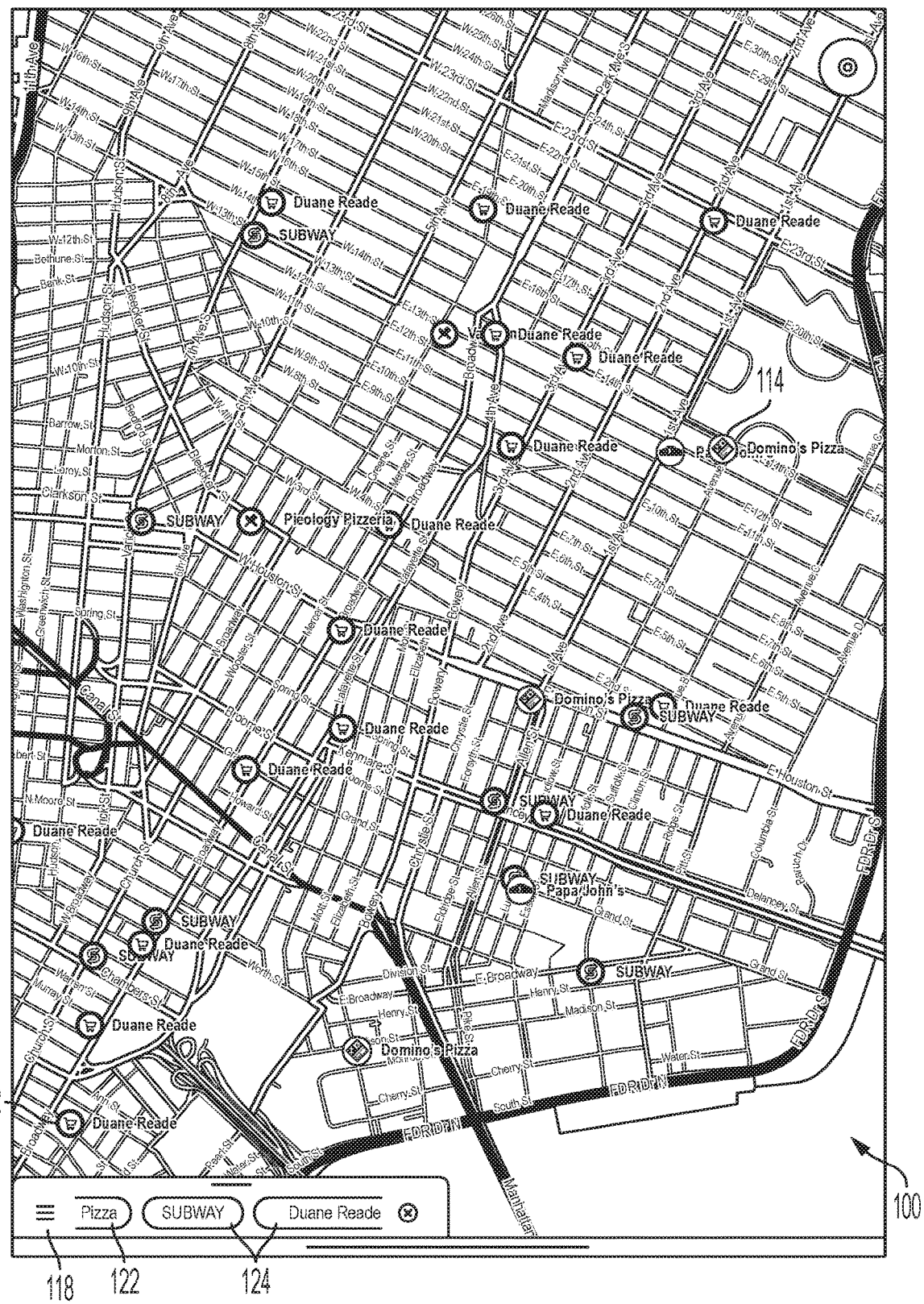
FIG. 4A schematically illustrates an exemplary interface displaying a multi-criteria query utilized within a city, according to one or more embodiments shown and described herein.

Referring now to FIG. 4A, an exemplary interface 100 displaying a multi-criteria query utilized within a city is depicted, through which embodiments of the disclosure can be implemented. In this embodiment (which may be referred to herein as "city mode"), a user utilizes a query 118 for a category component 122 (pizza) and destination components 124 (SUBWAY® and DUANE READE®). DUANE READE® is a registered trademark of DUANE READE GENERAL PARTNERSHIP. S design is a registered trademark of SUBWAY IP LLC. DOMINO'S PIZZA design is a registered trademark of DOMINO'S IP HOLDER LLC LIMITED LIABILITY COMPANY. PIEOLOGY P PIZZERIA design is a registered trademark of The Little Brown Box Pizza, LLC.

In this embodiment, a user may search the surrounding area for category components 122 and/or destination components 124, rather than being based upon a highway route from a starting point to a destination. Other related category components 122 and/or destination components 124 may also be provided, which can provide the user with more options, particularly if suitable substitute options are available for one destination type/category near one of the other destination types/categories that were part of the query 118. In this embodiment, results are based upon a radius of current or any other specified location, where the radius may be defined by the user or the interface 100.

Figure 4B:
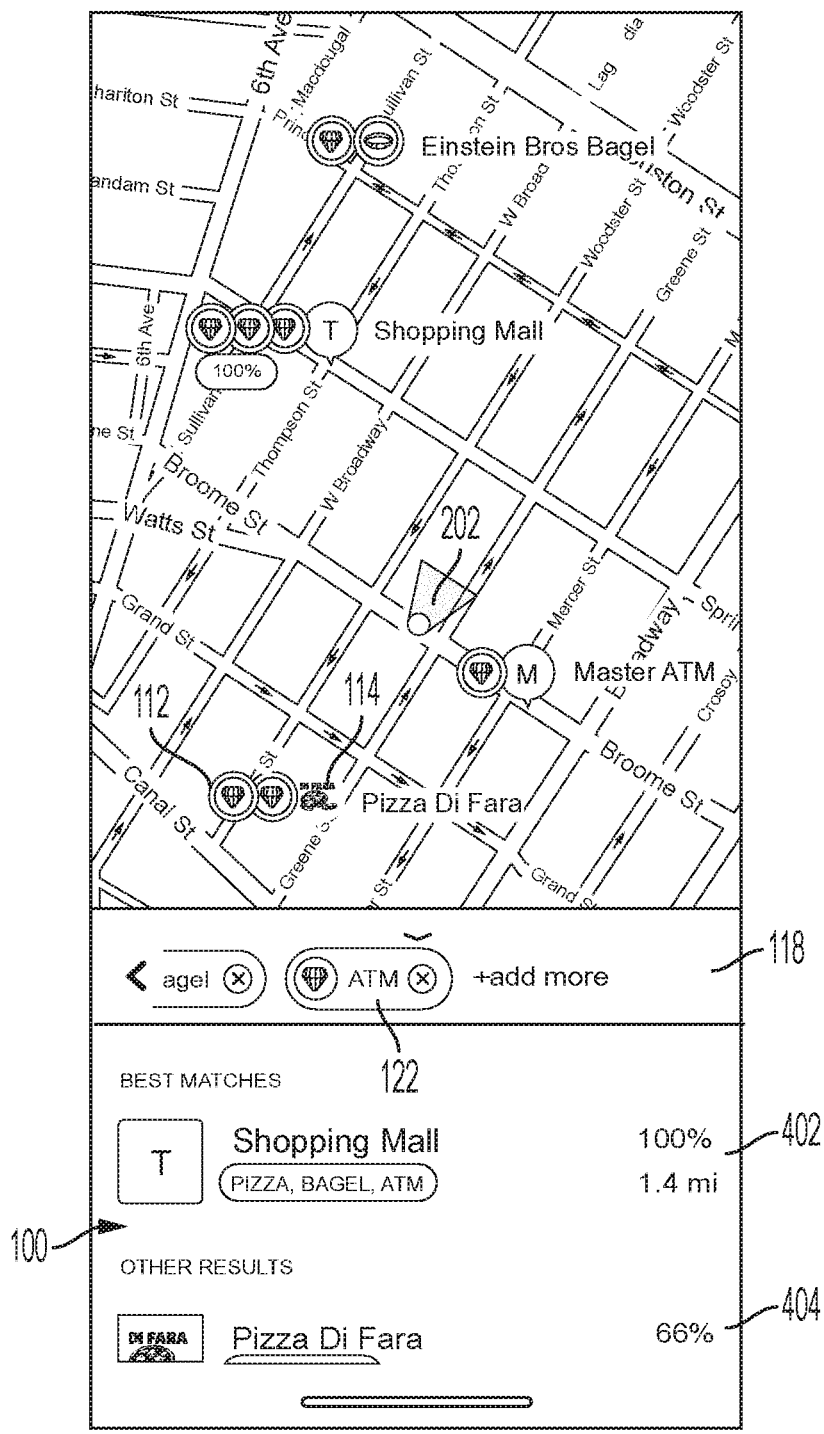
FIG. 4B schematically illustrates an exemplary interface displaying clustered results from a multi-criteria query utilized within a city, according to one or more embodiments shown and described herein.

Referring now to FIG. 4B, an exemplary interface 100 displaying clustered results from a multi-criteria query utilized within a city is depicted, through which embodiments of the disclosure can be implemented. In this embodiment, a user has entered a query within a city utilizing category components 122 for a bagel shop, a pizza shop, and an ATM. Locations may be scored based upon meeting the criteria of the query 118. A shopping mall is scored as a best match 402 at 100% for having an ATM, a pizza place, and a bagel place. In this embodiment, match scores may be displayed on one or more of the locations, such as the shopping mall displaying a 100% on the map view. Other results 404 include a pizza place scored at 66% for being near an ATM but not near a bagel place. At another location, an Einstein Bros Bagel® is located near an ATM but not near a pizza place. Einstein Bros Bagel® is a registered trademark of EINSTEIN AND NOAH CORP. In this embodiment, a threshold distance that constitutes "near" may be user-defined or determined by the interface 100. In some embodiments, a user or the interface may determine a threshold amount to determine which matches are displayed on the map and/or in the results list.

Figure 5A:
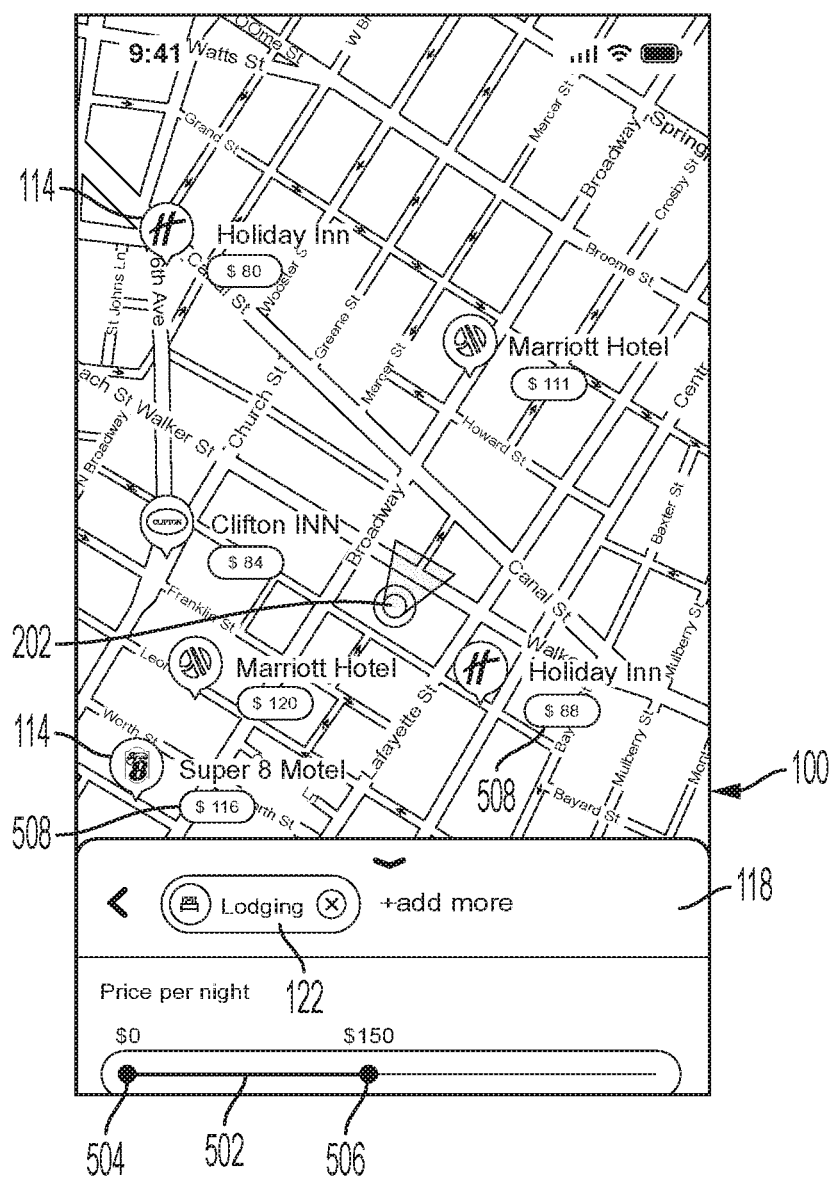
FIG. 5A schematically illustrates an exemplary interface displaying a city navigation-based hotel finder with price options, according to one or more embodiments shown and described herein.

Referring now to FIG. 5A, an exemplary interface 100 displaying a city navigation-based hotel finder with price options is depicted, through which embodiments of the disclosure can be implemented. In this embodiment, a category component 122 for lodging has been selected for a query 118. Various hotels, such Holiday Inn®, Marriott®, and Super 8® are displayed on the map view with price indicators 508 based upon a price slider 502 with a minimum price 504 and a maximum price 506. Holiday Inn® and design is a registered trademark of Six Continents Hotels, Inc. Marriott Hotel® is a registered trademark of MARRIOTT INTERNATIONAL, INC. Super 8 Motel design is a registered trademark of 97034 CORPORATION. In some embodiments, price may be based upon various selectable time criteria (such as weekly, and the like) and may allow the exclusion of below a minimum price 504 or above a maximum price 506. In this embodiment, the slider may be adjusted to affect the results on the map view in real-time. Other category components 122 and/or destination components 124 may be added as well.

Figure 5B:
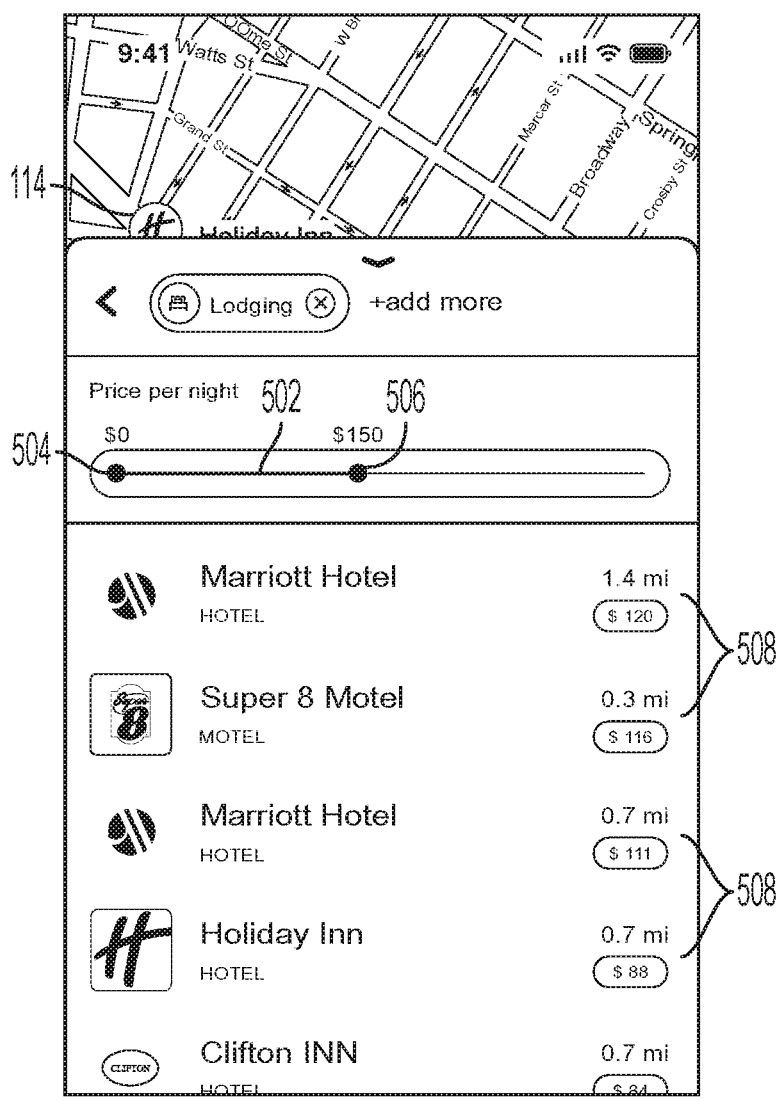
FIG. 5B schematically illustrates an exemplary interface displaying a city navigation-based hotel price options, according to one or more embodiments shown and described herein.

Referring now to FIG. 5B, an exemplary interface 100 displaying a city navigation-based hotel price options is depicted, through which embodiments of the disclosure can be implemented. Continuing with the embodiment of FIG. 5B, a list view of the hotel best results is presented. The hotels are presented based upon price in descending order, although any suitable sorting criteria (distance, alphabetical, and the like). In this embodiment, the slider may be adjusted to affect the list view results in real-time.

Figure 6A:
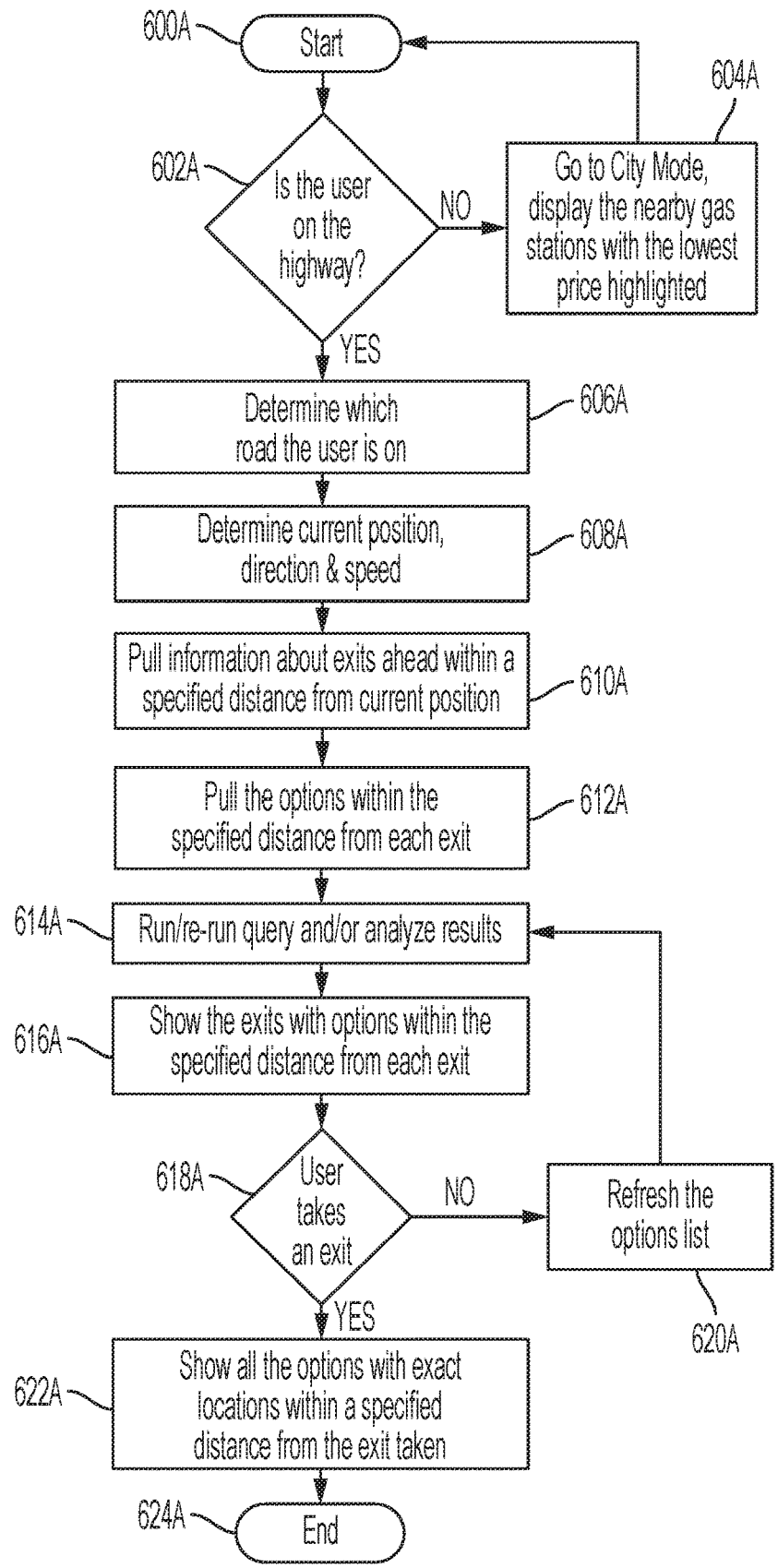
FIG. 6A is a flow chart depicting a highway mode of operation, according to one or more embodiments shown and described herein.

Referring now to FIG. 6A, a flowchart depicting a highway mode of operation is shown according to various embodiments. At block 600A the flowchart begins and proceeds to block 602A where a determination is made as to whether the user (via their portable client device) is travelling along on a highway. This may be determined by evaluating, for example, whether the user is travelling along a linear route, whether the route is designated as a highway, the number of cross-roads, and the like. If the user is not on a highway, then at block 604A the interface goes into city mode and/or displays nearby gas stations with the lowest price highlighted, and then the flowchart returns to the start at block 600A. Otherwise, if the user is on a highway, then the flowchart proceeds to block 606A, at which point the interface determines which road the user is currently on. At block 608A the current position, direction, and speed of the user are determined.

At block 610A, data is received regarding a result set pertaining to exits within a specified distance (which may be user-specified or based upon the interface) of the current location. The data may be received from any suitable source, such as a remote database or server. In this embodiment, the exits are with respect to exits ahead of the user along the highway while excluding exits that the user has already passed. At block 612A, a result subset is determined for each exit in the form of destination components and/or category components that are within a specified distance of the exit. The distance, which may be in the form of a radius, may be received from the interface or other data source, or may be user-specified. At block 614A, the query may be re-run periodically based upon an elapsed distance travelled, time elapsed, and/or any other suitable metric. The query may also be run based upon any updates to the query. At this point, a result set and/or any result subsets pertaining to one or more exits may also be re-analyzed according to the query. At block 616A, exits and associated result subsets of destination category icons and/or destination type icons may be displayed. At block 618A, a determination is made as to whether or not the user has taken an exit off of the highway that has a result subset. If not, then at block 620A the flowchart returns to block 614A and the query may be re-run to refresh the result set (exits, result subsets, destination category icons, destination type icons, destination category components, destination type components, and the like). Otherwise, if the user has taken an exit, then at block 622A an updated view of the exit may be displayed with more specificity regarding the result subset associated with the exit, including a closer map and/or list view of the destination category icons and the destination type icons. At block 624A the flowchart terminates.

Figure 6B:
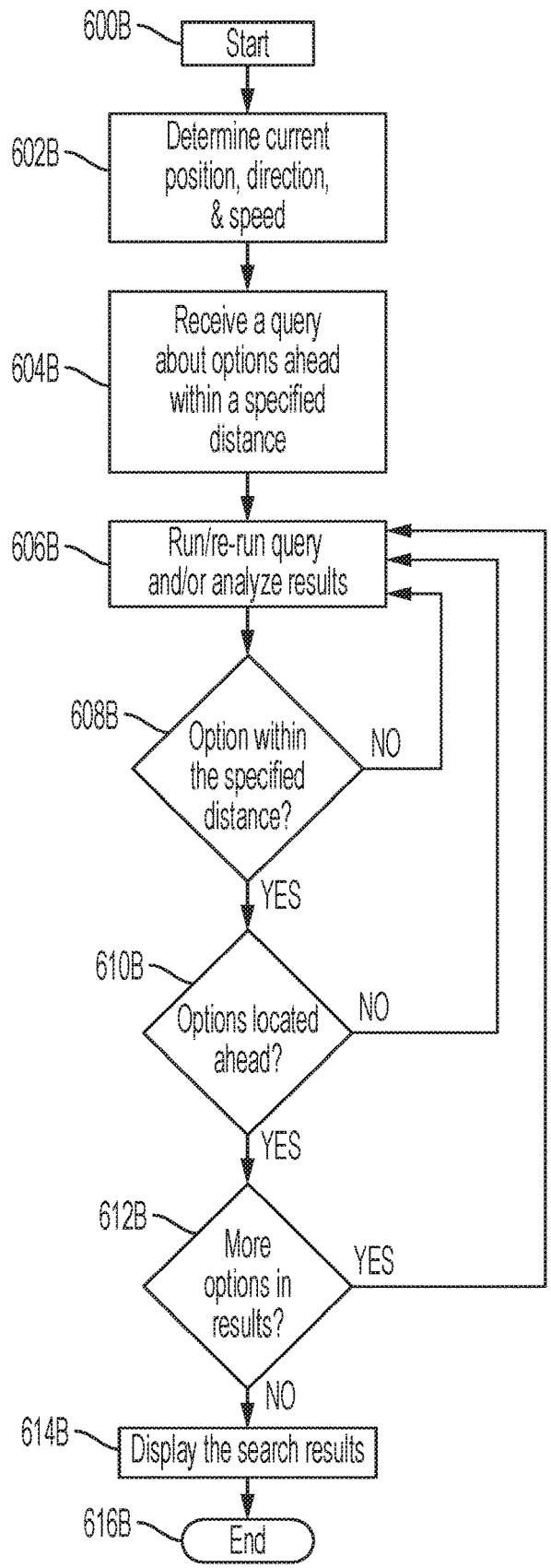
FIG. 6B is a flow chart depicting an alternate highway mode of operation, according to one or more embodiments shown and described herein.

Referring now to FIG. 6B, a flowchart depicting an alternate highway mode of operation is shown according to various embodiments. At block 600B the flowchart begins and proceeds to block 602B where the current position, direction, and/or speed of the user (via a portable client device) travelling along a highway or other suitable road are determined by the portable client device and/or another device that receives the position, direction, and/or speed from the portable client device to make the determination. At block 604B, a query is received from the user specifying destination category components, destination type components, a specified distance for exits ahead on the highway, and/or a specified distance for destination category components and/or destination type components from the exit. At block 606B, the results of the query are received and analyze and/or the query is re-run based upon an elapsed distance travelled, time elapsed, and/or any other suitable metric.

At block 608B, a determination is made as to whether any destination category components and/or destination type components are within the specified distance of the user on the highway. In this embodiment, if there is no result set (i.e., no results that match the current query), then the flowchart returns to block 606B to re-run the query, which may be re-run immediately or after an elapsed period of time, wherein any such options may be defined by the interface and/or specified by the user. Otherwise, if there are one or more results in the result set, then the flowchart proceeds to block 610B where a determination is made as to whether any of the results in the result set are located ahead of the user. If not, and the user has already passed all results on the highway, then no results are returned in response to the query, and the flowchart returns to block 606B. In other embodiments, results behind the user along the highway may be returned. If more options are available in the results, then the flowchart returns to block 606B to re-run the query. Otherwise, if there are no more options available in the result set, then at block 614B the query results are displayed and at block 616B the flowchart terminates.

Figure 7A:
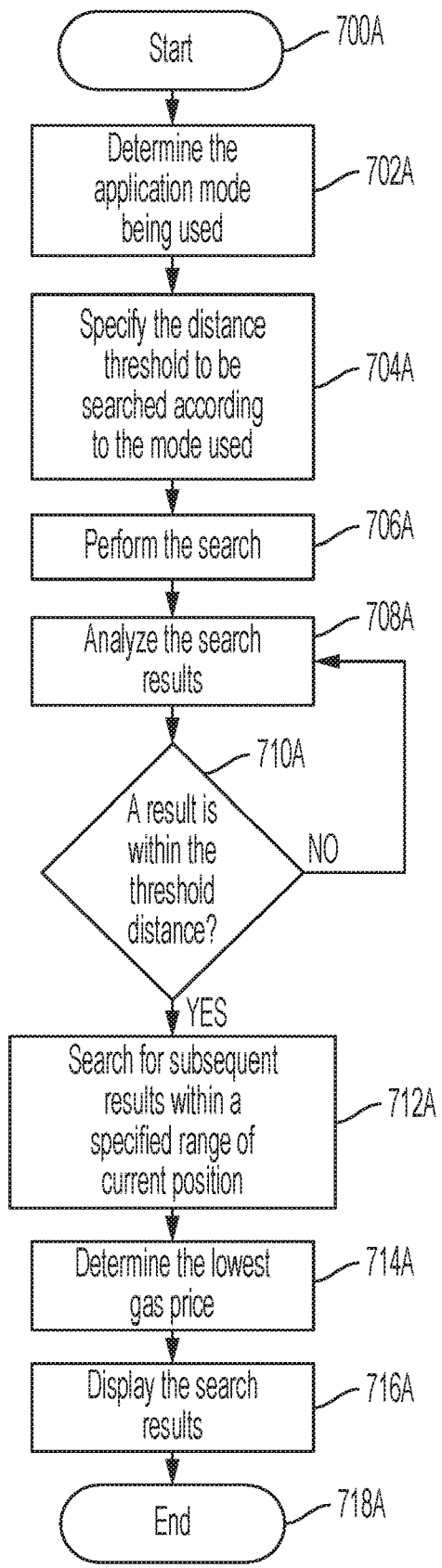
FIG. 7A is a flow chart depicting a determination of cheapest gas along a route, according to one or more embodiments shown and described herein.

Referring now to FIG. 7A, a flowchart depicting a determination of cheapest gas along a route is shown according to various embodiments. At block 700A, the flowchart begins and proceeds to block 702A where the application mode (highway mode, city mode, trav match, and the like) being used is determined. This may be determined by evaluating, for example, whether the linearity of the route, whether the route is designated as a highway, the number of cross-roads, and the like. At block 704A, a distance threshold is specified by the user or the interface according to the mode used, such as by way of non-limiting examples, a radius in city mode, a distance ahead on the highway, and the like. At block 706A, a query may be executed and a search may be performed. At block 708A, the search results may be analyzed. At block 710A, a determination is made as to whether a result is within the threshold distance. If not, then the flowchart returns to block 708A. Otherwise, the flowchart proceeds to block 712A, where there is a search for subsequent results within a specified range of the current position, relative to the application mode being used. At block 714A, gas prices for gas stations may be compared, such that a lowest gas price among the gas stations within the search results may be determined. In other embodiments, other types of prices for other types of category components may be compared. At block 716A, the search results may be displayed in the interface, and at block 718A the flowchart terminates.

Figure 7B:
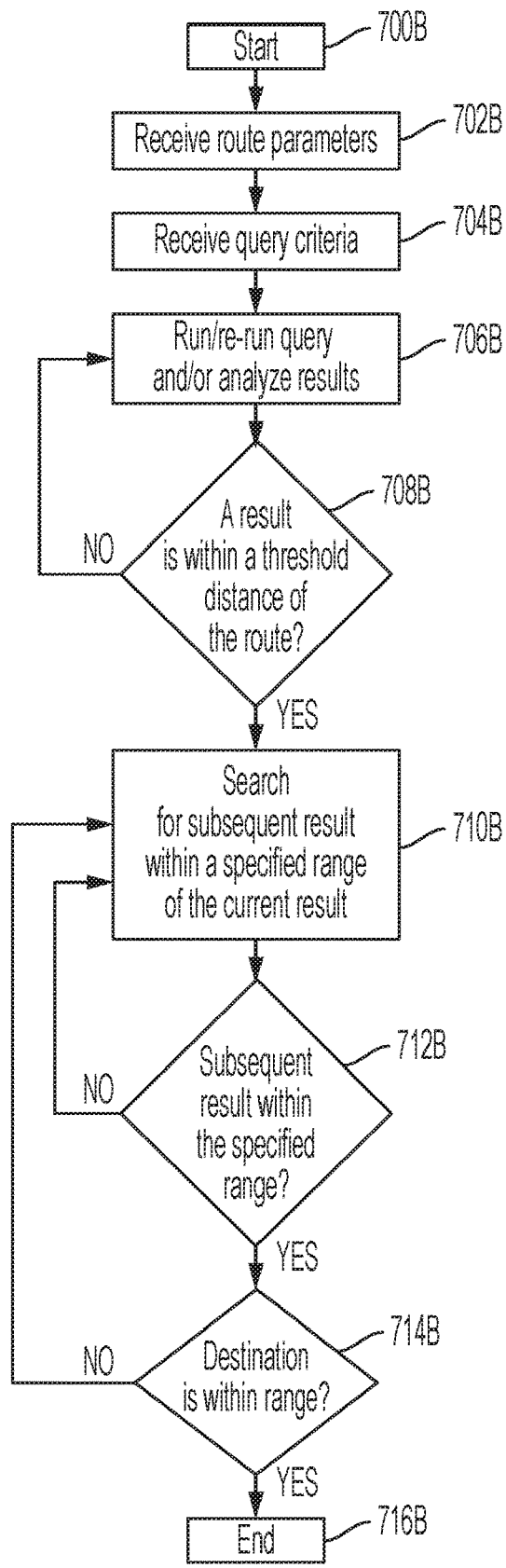
FIG. 7B is a flow chart depicting a query for chained results, according to one or more embodiments shown and described herein.

Referring now to FIG. 7B, a flowchart depicting a query for chained results is shown according to various embodiments. At block 700B the flowchart begins and proceeds to block 702B where route parameters may be received, such as starting location, destination, distance, time requirements, a threshold amount of deviation from route, and the like. At block 704B, query criteria may be received such as category components, destination components, price preferences/requirements, distance between results, and the like. At block 706B, a query with the query criteria and route parameters may be run, or updated/re-run based upon passage of time, change in location, updated query criteria, and the like. At block 708B a determination is made as to whether search results are within a threshold distance of the route. If not, then the flowchart returns to block 706B to re-run the query. If search results are within a threshold distance of the route, then at block 710B subsequent results may be searched within a specified range of the current results. Non-limiting examples of ranges include geographic distance from other results, distance from the route (such as a highway), expected travel time, and the like.

At block 712B a determination is made as to whether there are subsequent results within the specified range. If not, then the flowchart returns to search for additional subsequent results within the specified range at block 710B. If there are no subsequent results within the specified range, then at block 714B a determination is made as to whether a destination is within the specified range. If not, then the flowchart returns to block 710B where subsequent results may be searched within the specified range of the current results. Otherwise, if there are subsequent results within the specified range, then the flowchart terminates at block 716B.

Figure 8A:
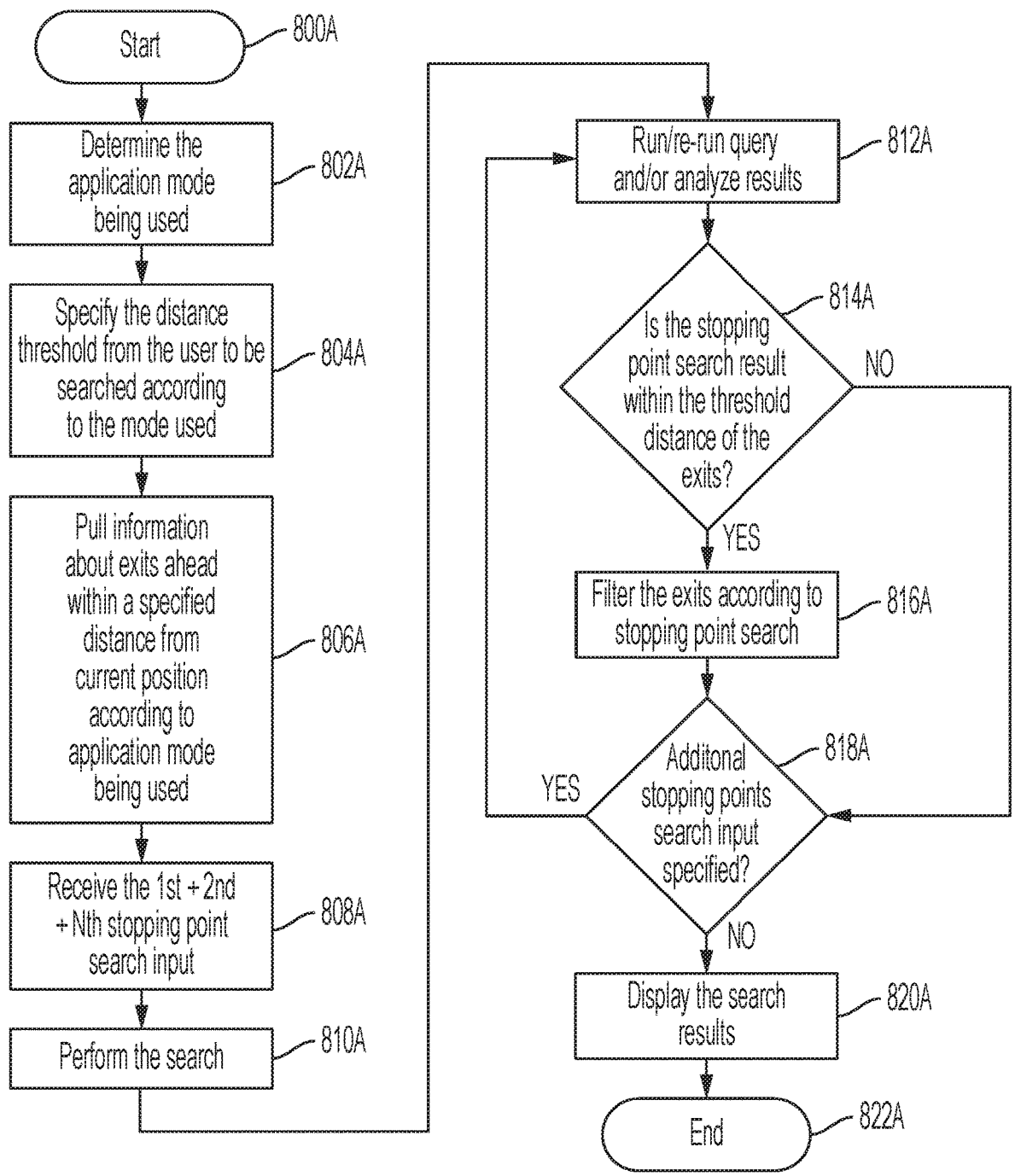
FIG. 8A is a flow chart depicting a multi-criteria query utilizing clustered results, according to one or more embodiments shown and described herein.

Referring now to FIG. 8A, a flowchart depicting a multi-criteria query utilizing clustered results is shown according to various embodiments. At block 800A, the flowchart begins and proceeds to block 802A where the application mode (highway mode, city mode, trav match, and the like) being used is determined. This may be determined by evaluating, for example, the linearity of the route, whether the route is designated as a highway, the number of cross-roads, and the like. At block 804A, a distance threshold is specified by the user or the interface according to the mode used, such as by way of non-limiting examples, a radius in city mode, a distance ahead on the highway, and the like. At block 806A, information may be received about highway exits or other stopping points within a specified distance from the user's current position according to the application mode being used. At block 808A, one or more stopping points ($1^{st}$, $2^{nd}$, $N^{th}$) may be set based upon category components and/or destination components received from the user. In some embodiments, the user may specify one or more stopping points not related to a category component or a destination component, but rather a specific location. At block 810A, the search with the stopping points may be performed. At block 812A, the query may be run or re-run and the results may be analyzed or re-analyzed.

At block 814A, a determination is made as to whether a stopping point search result is within the specified distance threshold, such as within a threshold distance of a highway exit. If the stopping point search result is within the specified distance threshold, then at block 816A the results are filtered according to the stopping point (such as a highway exit) and the flowchart then proceeds to block 818A. If not, then the flowchart proceeds from block 814A directly to block 818A where a determination is made as to whether there are additional stopping points specified as search inputs. If so, then the flowchart returns to block 812A. If not, then the search results are displayed at block 820A, and the flowchart terminates at block 822A.

Figure 8B:
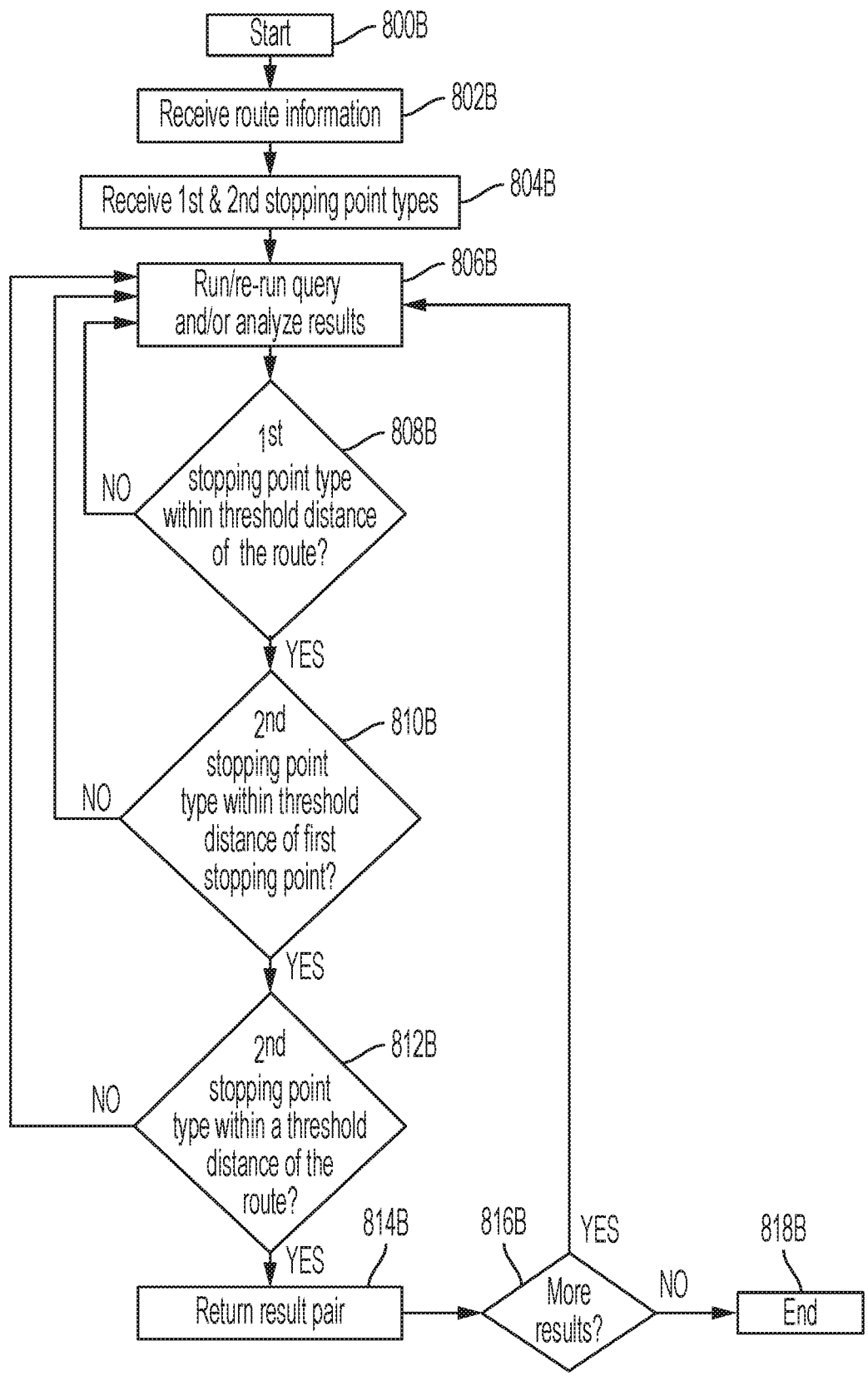
FIG. 8B is a flow chart depicting an alternate multi-criteria query utilizing clustered results, according to one or more embodiments shown and described herein.

Referring now to FIG. 8B, a flowchart depicting an alternate multi-criteria query utilizing clustered results is shown according to various embodiments. At block 800B the flowchart begins and proceeds to block 802B where route information is received from the user, such as a destination point, route selection, and the like. At block 804B, first and second stopping point types are received. In some embodiments, a stopping point type may correspond to a destination category icon, a destination type icon, a category component, a destination component, and the like. By way of non-limiting example, stopping point types may be a gas station and a restaurant, where the user wants to find both at the same highway exit. At block 806B, a query is run (or re-run if previously run) and/or the results are analyzed.

At block 808B, a determination is made as to whether the first stopping point type is within a threshold distance of the route. For example, this could be a determination of whether a gas station is within a mile of the highway. If not, then the flowchart returns to block 806B. If the first stopping point type is within a threshold distance of the route, then at block 810B a determination is made as to whether a second stopping point type is within a threshold distance of the first stopping point. For example, this could be a determination of whether a restaurant is within half a mile of the gas station. If not, then the flowchart returns to block 806B. If the second stopping point type is within a threshold distance of the first stopping point, then at block 812B a determination is made as to whether the second stopping point is within a threshold distance of the route. For example, this could be a determination of whether the restaurant is within two miles of the gas station so that the user does not wander too far from the route. If not, then the flowchart returns to block 806B. If the second stopping point is within a threshold distance of the route, then at block 814B the first stopping point type and the second stopping point type may be returned as a result pair. At block 816B, a determination is made as to whether there are more results. If so, then the flowchart returns to block 806B. Otherwise, if there are no more results at block 816B, then the flowchart proceeds to block 818B and terminates.

In another embodiment, the current location is moving along a travel route, the second threshold distance is a distance between a common location and each of the requested destination types within the result subset, and the common location is ahead of the current location along the travel route. There may be a plurality of result subsets, wherein each result subset corresponds to a different common location ahead of the current location along the travel route. For each of a plurality of common locations ahead of the current location along the travel route, it may be determined whether each of the requested destination types are within the second threshold distance of the common location. For each common location, an indication may be returned of each of the requested destination types accompanying each of the one or more common locations, wherein each of the plurality of the requested destination types belong to at least one of a plurality of destination categories. The destination categories may each comprise a plurality of destination types. An indication of the destination category or the different destination type may be provided based upon a requested destination type not being within the second threshold distance of a common location and a different destination type within a same destination category being within the second threshold distance of the same common location. Each of the plurality of the requested destination types may belong to one of a plurality of destination categories and each of the destination categories comprise a plurality of destination types, which may include associating a value with each destination type that is within (i) a requested destination category and (ii) a specified distance of a common location ahead of the current location along the travel route, and returning a specified top-N quantity of the selected destination types based upon a sorting of the associated values.

Figure 9:
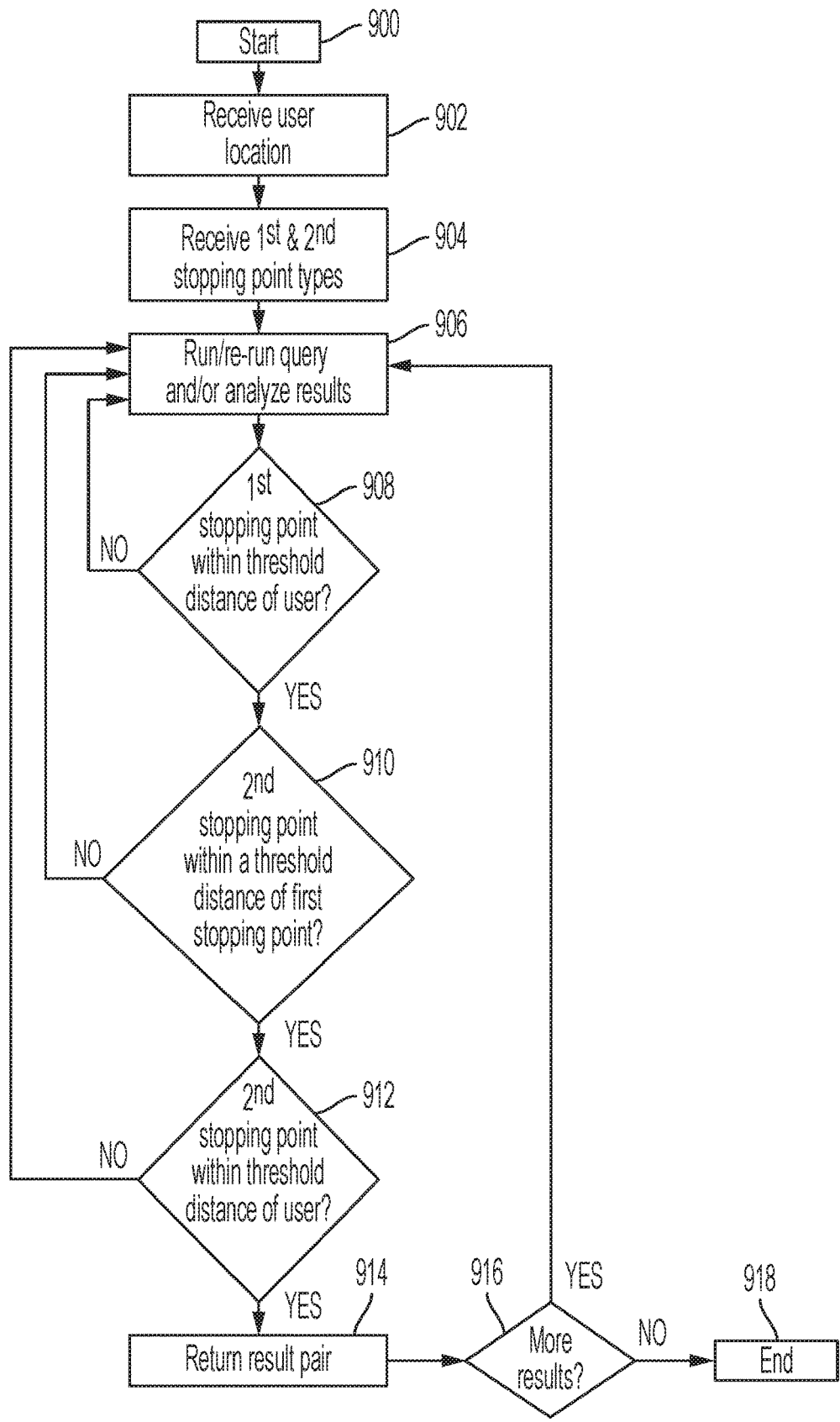
FIG. 9 is a flow chart depicting a multi-criteria query utilized within a city, according to one or more embodiments shown and described herein.

Referring now to FIG. 9, a flowchart depicting a multi-criteria query utilized within a city is shown according to various embodiments. At block 900 the flowchart begins and proceeds to block 902 where a user location is received from the user's client device or other devices in communication with the user's client device. At block 904, first and second stopping point types are received. In some embodiments, a stopping point type may correspond to a destination category icon, a destination type icon, a category component, a destination component, and the like. By way of non-limiting example, stopping point types may be a gas station and a restaurant, where the user wants to find both at the same highway exit. At block 906, a query is run (or re-run if previously run) and/or the results are analyzed.

At block 908, a determination is made as to whether the first stopping point type is within a threshold distance of the user. For example, this could be a determination of whether a pharmacy is within a mile of the user. If not, then the flowchart returns to block 906. If the first stopping point type is within a threshold distance of the user, then at block 910 a determination is made as to whether a second stopping point type is within a threshold distance of the first stopping point. For example, this could be a determination of whether a restaurant is within half a mile of the pharmacy. If not, then the flowchart returns to block 906. If the second stopping point type is within a threshold distance of the first stopping point, then at block 912 a determination is made as to whether the second stopping point is within a threshold distance of the user. For example, this could be a determination of whether the restaurant is within two miles of the user so they do not travel too far to reach multiple stopping points. If not, then the flowchart returns to block 906. If the restaurant is within two miles of the user, then at block 914 the first stopping point type and the second stopping point type may be returned as a result pair. At block 916, a determination is made as to whether there are more results. If so, then the flowchart returns to block 918. Otherwise, if there are no more results at block 916, then the flowchart proceeds to block 918 and terminates.

Figure 10:
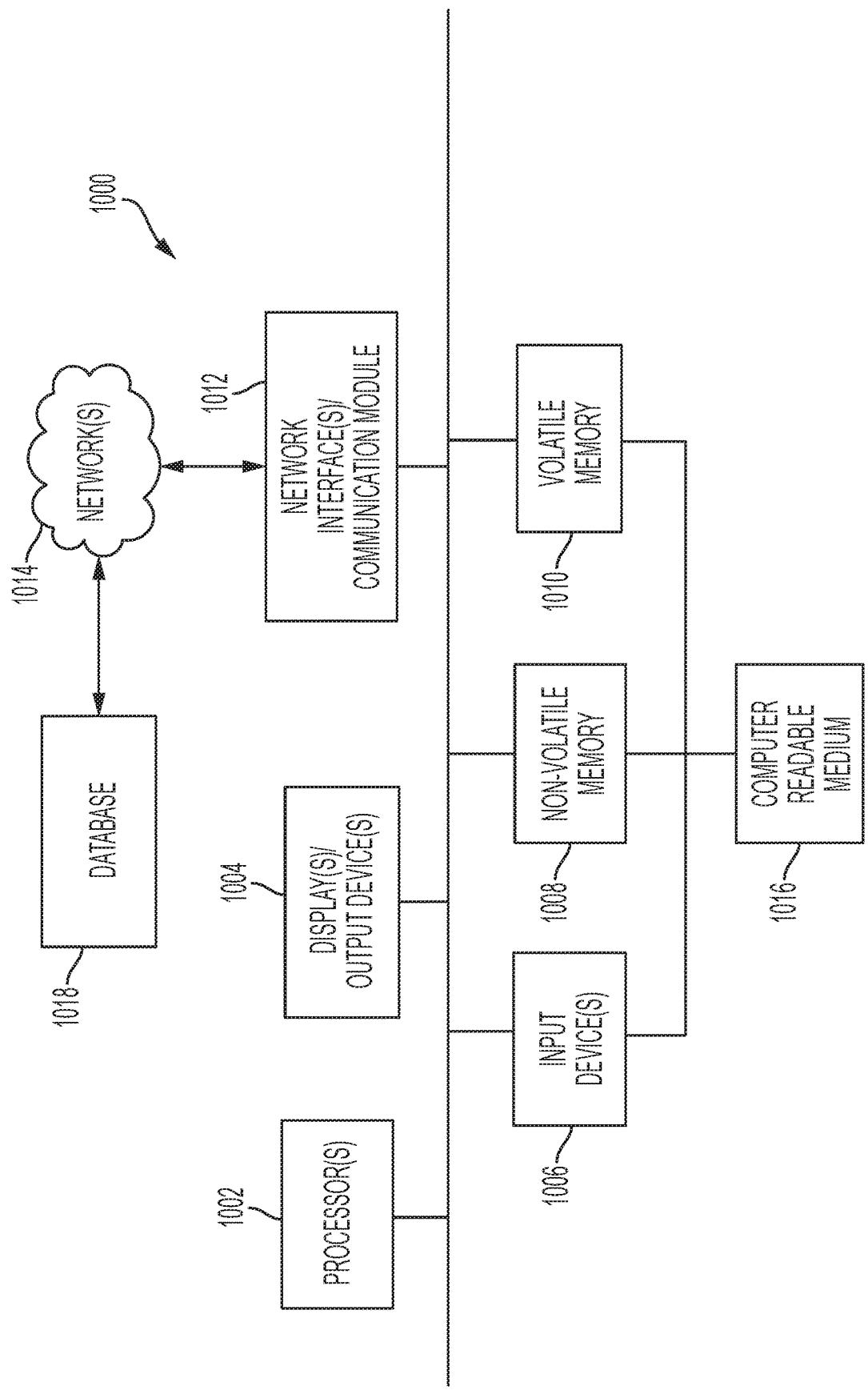
FIG. 10 is a block diagram illustrating computing hardware utilized in one or more devices, according one or more embodiments shown and described herein.

Referring now to FIG. 10, a block diagram illustrates an exemplary computing device 1000, through which embodiments of the disclosure can be implemented. The computing device 1000 described herein is but one example of a suitable computing device and does not suggest any limitation on the scope of any embodiments presented. The computing device 1000 in some embodiments may also be utilized to implement a synchronizing sensor and/or a recorder. Nothing illustrated or described with respect to the computing device 1000 should be interpreted as being required or as creating any type of dependency with respect to any element or plurality of elements. In various embodiments, a computing device 1000 may include, but need not be limited to, a desktop, laptop, server, client, tablet, smartphone, or any other type of device that can compress data. In an embodiment, the computing device 1000 includes at least one processor 1002 and memory (non-volatile memory 1008 and/or volatile memory 1010). The computing device 1000 can include one or more displays and/or output devices 1004 such as monitors, speakers, headphones, projectors, wearable-displays, holographic displays, and/or printers, for example. Output devices 1004 may further include, for example, audio speakers, devices that emit energy (radio, microwave, infrared, visible light, ultraviolet, x-ray and gamma ray), electronic output devices (Wi-Fi, radar, laser, etc.), audio (of any frequency), etc.

The computing device 1000 may further include one or more input devices 1006 which can include, by way of example, any type of mouse, keyboard, disk/media drive, memory stick/thumb-drive, memory card, pen, touch-input device, biometric scanner, voice/auditory input device, motion-detector, camera, scale, and the like. Input devices 1006 may further include sensors, such as biometric (blood pressure, pulse, heart rate, perspiration, temperature, voice, facial-recognition, iris or other types of eye recognition, hand geometry, fingerprint, DNA, dental records, weight, or any other suitable type of biometric data, etc.), video/still images, motion data (accelerometer, GPS, magnetometer, gyroscope, etc.) and audio (including ultrasonic sound waves). Input devices 1006 may further include cameras (with or without audio recording), such as digital and/or analog cameras, still cameras, video cameras, thermal imaging cameras, infrared cameras, cameras with a charge-couple display, night-vision cameras, three-dimensional cameras, webcams, audio recorders, and the like.

The computing device 1000 typically includes non-volatile memory 1008 (ROM, flash memory, etc.), volatile memory 1010 (RAM, etc.), or a combination thereof. A network interface 1012 can facilitate communications over a network 1014 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 1012 can be communicatively coupled to any device capable of transmitting and/or receiving data via the network 1014. Accordingly, the network interface hardware 1012 can include a communication transceiver for sending and/or receiving any wired or wireless communication. For example, the network interface hardware 1012 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 1016 may comprise a plurality of computer readable mediums, each of which may be either a computer readable storage medium or a computer readable signal medium. A computer readable storage medium 1016 may reside, for example, within an input device 1006, non-volatile memory 1008, volatile memory 1010, or any combination thereof. A computer readable storage medium can include tangible media that is able to store instructions associated with, or used by, a device or system. A computer readable storage medium includes, by way of example: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 1000 may include one or more network interfaces 1012 to facilitate communication with one or more remote devices, which may include, for example, client and/or server devices. A network interface 1012 may also be described as a communications module, as these terms may be used interchangeably. A database 1018 may be remotely accessible on a server or other distributed device and/or stored locally in the computing device 1100.

Figure 11:
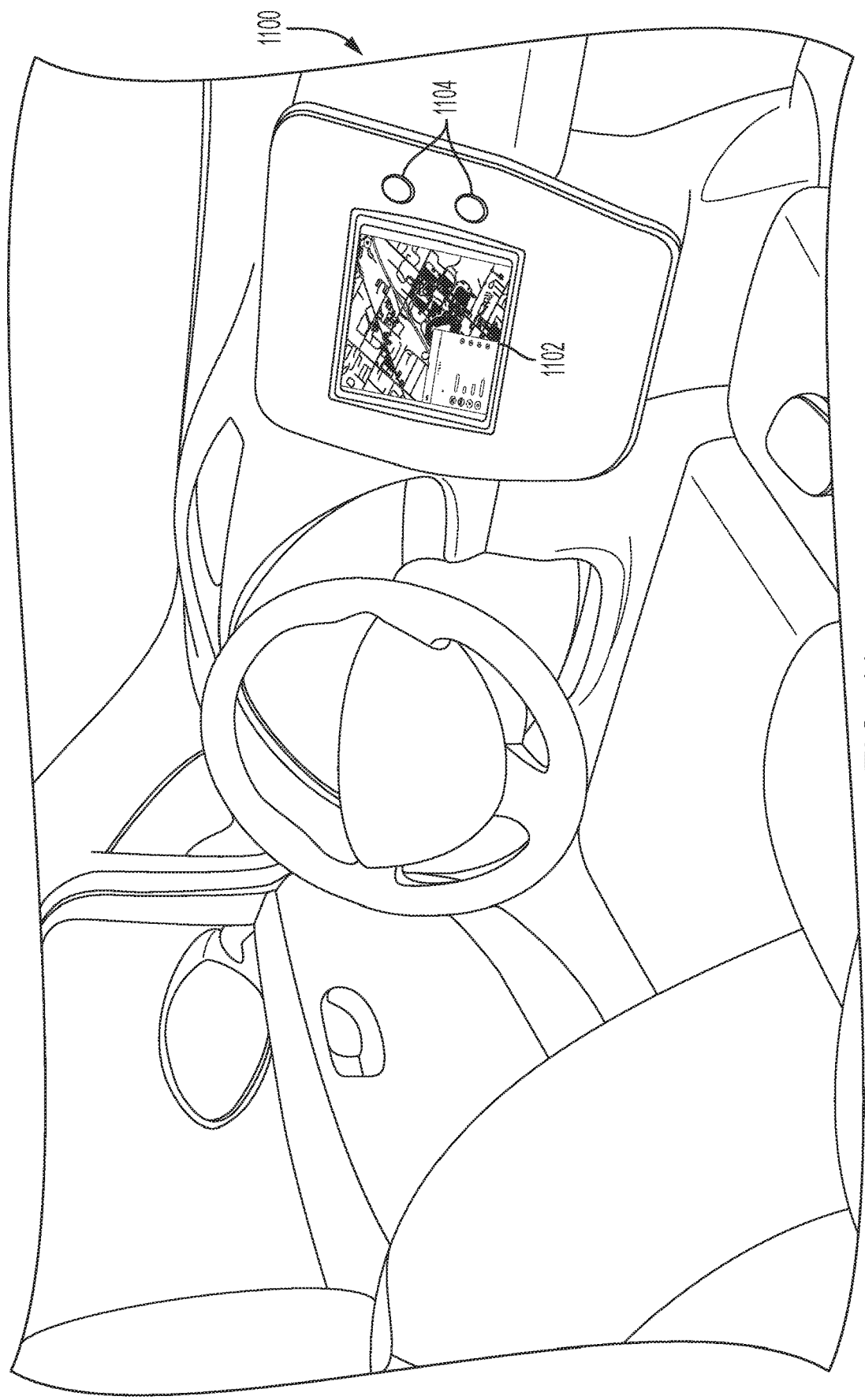
FIG. 11 schematically illustrates an in-vehicle system interface, according one or more embodiments shown and described herein.

Referring now to FIG. 11, a vehicle 1100 is depicted with a console 1102, through which embodiments of the disclosure can be implemented. In this embodiment, a vehicle 1100 may include a console 1102 and display inputs 1104. Any suitable type of console 1102 may be utilized, such as a touch screen, or any other suitable type of display, such as discussed above with respect to 1004 FIG. 10. Any suitable type of display inputs 1104 may be utilized, such as buttons, knobs, on-screen inputs such as buttons, or those discussed above with respect to 1006 FIG. 10. In some embodiments, a voice control option may be available to allow a user to operate the embodiments herein via voice command.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   determining a current location based upon received location data;
   determining a travel route from the current location to a specified destination location;
   receiving a query, from a user interface, requesting a plurality of requested destination types along the travel route, wherein:
      each of the plurality of requested destination types belongs to at least one of a plurality of destination categories; and
      each of the destination categories comprises two or more of the plurality of requested destination types;
   determining a result set comprising a plurality of locations corresponding to the plurality of requested destination types along the travel route;
   displaying, via the user interface and in response to the received query, a plurality of result subsets, wherein:
      each result subset of the plurality of result subsets comprises subset of the plurality of requested destination types in the result set based upon a threshold distance,
      the threshold distance associated with each result subset is a distance between:
         each of the requested destination types within the respective result subset; or
         a common location and each of the requested destination types within the respective result subset, and
      at least one result subset of the plurality of result subsets comprises another destination type within a same destination category as a requested destination type from the plurality of requested destination types based at least in part on the requested destination type not being within the threshold distance associated with the at least one result subset, the other destination type being within the threshold distance associated with the at least one result subset; and
   updating the current location, the result set, and the plurality of result subsets based upon receiving updated location data.

2. The method of claim 1, wherein:
   the current location is moving along the travel route;
   the threshold distance associated with each result subset is the distance between the common location and each of the requested destination types within the respective result subset; and
   each common location is ahead of the current location along the travel route.

3. The method of claim 2, wherein each result subset of the plurality of result subsets corresponds to a different common location ahead of the current location along the travel route.

4. The method of claim 3, further comprising:
   determining, for each of a plurality of common locations ahead of the current location along the travel route, whether each of the requested destination types are within the threshold distance of the common location; and
   returning, for each common location, an indication of each of the requested destination types accompanying each of the one or more common locations.

5. The method of claim 1, further comprising:
   associating a value with each of the plurality of destination types that is within (i) a requested destination category of the plurality of destination categories and (ii) a specified distance of a common location ahead of the current location along the travel route; and
   returning a specified top-N quantity of the plurality of destination types based upon a sorting of the associated values.

6. The method of claim 1, further comprising:
   determining the current location is located on a highway, wherein determining the travel route from the current location to the specified destination location occurs in response to determining the current location is located on the highway.

7. The method of claim 1, further comprising:
   associating a value with each of the plurality of destination types that is within (i) a requested destination category of the plurality of destination categories and (ii) a specified distance of a common location ahead of the current location along the travel route; and
   displaying each of the plurality of destination types and the value associated with each of the plurality of destination types.

8. A system comprising:
   memory and a processor coupled to the memory, wherein the processor is configured to:
   determine a current location based upon received location data; determine a travel route from the current location to a specified destination location;
   receive a query, from a user interface, requesting a plurality of requested destination types along the travel route, wherein:
      each of the plurality of requested destination types belongs to at least one of a plurality of destination categories; and
      each of the destination categories comprises two or more of the plurality of requested destination types;
   determining a result set comprising a plurality of locations corresponding to the plurality of requested destination types along the travel route;

displaying, via the user interface and in response to the received query, a plurality of result subsets, wherein:
  each result subset of the plurality of result subsets comprises subset of the plurality of requested destination types in the result set based upon a threshold distance,
  the threshold distance associated with each result subset is a distance between:
    each of the requested destination types within the respective result subset; or
    a common location and each of the requested destination types within the respective result subset, and
  at least one result subset of the plurality of result subsets comprises another destination type within a same destination category as a requested destination type from the plurality of requested destination types based at least in part on the requested destination type not being within the threshold distance associated with the at least one result subset, the other destination type being within the threshold distance associated with the at least one result subset; and
  update the current location, the result set, and the plurality of result subsets based upon receiving updated location data.

9. The system of claim 8, wherein:
the current location moves along the travel route;
the threshold distance associated with each result subset is the distance between the common location and each of the requested destination types within the respective result subset; and
each common location is ahead of the current location along the travel route.

10. The system of claim 9, wherein each result subset of the plurality of result subsets corresponds to a different common location ahead of the current location along the travel route.

11. The system of claim 10, wherein the processor is further configured to:
determine, for each of a plurality of common locations ahead of the current location along the travel route, whether each of the requested destination types are within the threshold distance of the common location; and
return, for each common location, an indication of each of the requested destination types accompanying each of the one or more common locations.

12. The system of claim 8, wherein the processor is further configured to:
associate a value with each of the plurality of destination types that is within (i) a requested destination category of the plurality of destination categories and (ii) a specified distance of a common location ahead of the current location along the travel route; and
return a specified top-N quantity of the plurality of destination types based upon a sorting of the associated values.

13. The system of claim 8, wherein the processor is further configured to:
associate a value with each of the plurality of destination types that is within (i) a requested destination category of the plurality of destination categories and (ii) a specified distance of a common location ahead of the current location along the travel route; and
display each of the plurality of destination types and the value associated with each of the plurality of destination types.

14. The system of claim 8, wherein the processor is further configured to:
determine the current location is located on a highway,
wherein to determine the travel route from the current location to the specified destination location, the processors is configured to determine the travel route based on determining the current location is located on the highway.

15. A non-transitory computer readable medium embodying computer-executable instructions that, when executed by a processor, cause the processor to execute operations comprising:
determining a current location based upon received location data; determining a travel route from the current location to a specified destination location;
receiving a query, from a user interface, requesting a plurality of requested destination types along the travel route, wherein:
  each of the plurality of requested destination types belongs to at least one of a plurality of destination categories; and
  each of the destination categories comprises two or more of the plurality of requested destination types;
  determining a result set comprising a plurality of locations corresponding to the plurality of requested destination types along the travel route;
displaying, via the user interface and in response to the received query, a plurality of result subsets, wherein:
  each result subset of the plurality of result subsets comprises subset of the plurality of requested destination types in the result set based upon a threshold distance,
  the threshold distance associated with each result subset is a distance between:
    each of the requested destination types within the respective result subset; or
    a common location and each of the requested destination types within the respective result subset, and
  at least one result subset of the plurality of result subsets comprises another destination type within a same destination category as a requested destination type from the plurality of requested destination types based at least in part on the requested destination type not being within the threshold distance associated with the at least one result subset, the other destination type being within the threshold distance associated with the at least one result subset; and
  updating the current location, the result set, and the plurality of result subsets based upon receiving updated location data.

16. The non-transitory computer readable medium of claim 15, wherein:
the current location is moving along the travel route;
the threshold distance associated with each result subset is the distance between the common location and each of the requested destination types within the respective result subset; and
each common location is ahead of the current location along the travel route.

17. The non-transitory computer readable medium of claim 16, wherein each result subset of the plurality of result subsets corresponds to a different common location ahead of the current location along the travel route.

18. The non-transitory computer readable medium of claim 17, wherein the operations further comprise:

determining, for each of a plurality of common locations ahead of the current location along the travel route, whether each of the requested destination types are within the threshold distance of the common location; and returning, for each common location, an indication of each of the requested destination types accompanying each of the one or more common locations.

19. The non-transitory computer readable medium of claim 15, wherein the operations further comprise:

associating a value with each of the plurality of destination types that is within (i) a requested destination category of the plurality of destination categories and (ii) a specified distance of a common location ahead of the current location along the travel route; and displaying each of the plurality of destination types and the value associated with each of the plurality of destination types.

20. The non-transitory computer readable medium of claim 15, wherein the operations further comprise:

determining the current location is located on a highway, wherein determining the travel route from the current location to the specified destination location occurs in response to determining the current location is located on the highway.

* * * * *